(12) United States Patent
Takagi

(10) Patent No.: US 8,950,259 B2
(45) Date of Patent: Feb. 10, 2015

(54) ELEMENT STRUCTURE, INERTIA SENSOR, AND ELECTRONIC DEVICE

(75) Inventor: Shigekazu Takagi, Shimosuwa (JP)

(73) Assignee: Seiko Epson Corporation (JP)

( * ) Notice: Subject to any disclaimer, the term of this patent is extended or adjusted under 35 U.S.C. 154(b) by 904 days.

(21) Appl. No.: 13/115,580

(22) Filed: May 25, 2011

(65) Prior Publication Data

US 2011/0290023 A1    Dec. 1, 2011

(30) Foreign Application Priority Data

May 26, 2010 (JP) ................................. 2010-120725

(51) Int. Cl.
*G01P 15/125* (2006.01)
*G01P 15/18* (2013.01)
*G01C 19/5783* (2012.01)
*G01P 15/08* (2006.01)

(52) U.S. Cl.
CPC ............ *G01P 15/18* (2013.01); *G01C 19/5783* (2013.01); *G01P 15/125* (2013.01); *G01P 2015/0814* (2013.01); *G01P 2015/0828* (2013.01); *G01P 2015/0845* (2013.01); *G01P 2015/0865* (2013.01)
USPC ...................................................... 73/514.32

(58) Field of Classification Search
CPC ................ G01P 15/125; G01P 15/135; G01P 2015/0814; G01P 2015/0828; G01P 2015/0845; G01P 2015/0865; H05K 5/0021; H05K 13/00; G01C 19/5783
USPC ............................. 73/152.59, 514.16, 514.32
See application file for complete search history.

(56) References Cited

U.S. PATENT DOCUMENTS

| | | | | |
|---|---|---|---|---|
| 4,422,335 A | * | 12/1983 | Ohnesorge et al. | 73/724 |
| 4,426,673 A | * | 1/1984 | Bell et al. | 361/283.4 |
| 4,603,371 A | * | 7/1986 | Frick | 361/283.3 |
| 4,691,557 A | * | 9/1987 | Dunn et al. | 73/32 A |
| 5,349,492 A | * | 9/1994 | Kimura et al. | 361/283.4 |
| 5,623,099 A | | 4/1997 | Schuster et al. | |
| 5,854,625 A | * | 12/1998 | Frisch et al. | 345/173 |
| 5,905,203 A | | 5/1999 | Flach et al. | |
| 6,079,282 A | * | 6/2000 | Lanter | 73/862.626 |
| 6,105,427 A | | 8/2000 | Stewart et al. | |
| 6,370,960 B1 | * | 4/2002 | Igel et al. | 73/724 |
| 6,923,061 B2 | | 8/2005 | Tsubaki | |
| 7,624,638 B2 | * | 12/2009 | Konno et al. | 73/514.32 |
| 7,784,366 B2 | * | 8/2010 | Daverman et al. | 73/862.626 |

(Continued)

FOREIGN PATENT DOCUMENTS

| | | |
|---|---|---|
| CN | 101270989 A | 9/2008 |
| JP | 07-209327 | 8/1995 |

(Continued)

*Primary Examiner* — Peter Macchiarolo
*Assistant Examiner* — Samir M Shah
(74) *Attorney, Agent, or Firm* — Harness, Dickey & Pierce, P.L.C.

(57) ABSTRACT

The manufacturing of an element structure including two or more sensor element is to be facilitated. An element structure includes a first substrate including a first support layer and a first sensor element disposed on the first support layer and a second substrate including a second support layer and a second sensor element disposed on the second support layer, wherein the second substrate is disposed on the first substrate via a spacer member in a state in which the first sensor element and the second sensor element are disposed to face each other.

14 Claims, 22 Drawing Sheets

(56) References Cited

U.S. PATENT DOCUMENTS

| | | | |
|---|---|---|---|
| 7,785,027 B1* | 8/2010 | McKinley et al. | 401/195 |
| 8,104,344 B2* | 1/2012 | Fujiyoshi et al. | 73/504.12 |
| 8,250,926 B2* | 8/2012 | Yang et al. | 73/724 |
| 8,368,387 B2* | 2/2013 | Konno | 324/162 |
| 8,434,362 B2* | 5/2013 | Ohuchi et al. | 73/504.04 |
| 8,513,746 B2* | 8/2013 | Nakatani et al. | 257/415 |
| 2001/0023615 A1 | 9/2001 | Matsumoto et al. | 73/514.32 |
| 2002/0029637 A1* | 3/2002 | Matsumoto et al. | 73/504.01 |
| 2005/0202585 A1* | 9/2005 | Eskridge | 438/50 |
| 2007/0062302 A1* | 3/2007 | Khoury et al. | 73/780 |
| 2007/0240509 A1 | 10/2007 | Uchiyama et al. | |
| 2008/0030205 A1 | 2/2008 | Fujii et al. | |
| 2008/0110260 A1* | 5/2008 | Konno et al. | 73/514.32 |
| 2008/0202251 A1* | 8/2008 | Serban et al. | 73/780 |
| 2009/0008728 A1 | 1/2009 | Fujii et al. | |
| 2009/0229370 A1 | 9/2009 | Fujii et al. | |
| 2010/0011860 A1* | 1/2010 | Offenberg et al. | 73/514.32 |
| 2010/0021246 A1 | 1/2010 | Berlee et al. | |
| 2010/0230767 A1 | 9/2010 | Takagi et al. | |
| 2010/0242606 A1 | 9/2010 | Kanemoto | |
| 2010/0244160 A1 | 9/2010 | Kanemoto | |
| 2011/0031959 A1* | 2/2011 | Konno | 324/162 |
| 2011/0147863 A1 | 6/2011 | Fujii et al. | |
| 2011/0203373 A1* | 8/2011 | Konno | 73/514.32 |
| 2011/0278078 A1* | 11/2011 | Schediwy et al. | 178/18.06 |
| 2011/0283796 A1* | 11/2011 | Ohuchi et al. | 73/514.35 |
| 2012/0036915 A1* | 2/2012 | Franke et al. | 73/1.38 |
| 2013/0099292 A1* | 4/2013 | Nakatani | 257/254 |

FOREIGN PATENT DOCUMENTS

| | | |
|---|---|---|
| JP | 09-113534 | 5/1997 |
| JP | 2004-286535 | 10/2004 |
| JP | 2008-020433 A | 1/2008 |
| JP | 2009-033091 A | 2/2009 |
| JP | 2010-190636 | 9/2010 |
| JP | 2010-223952 | 10/2010 |
| JP | 2010-230441 | 10/2010 |
| JP | 2010-237196 | 10/2010 |
| JP | 2010-249805 | 11/2010 |
| JP | 2010-249806 | 11/2010 |
| JP | 2010-271302 | 12/2010 |

* cited by examiner

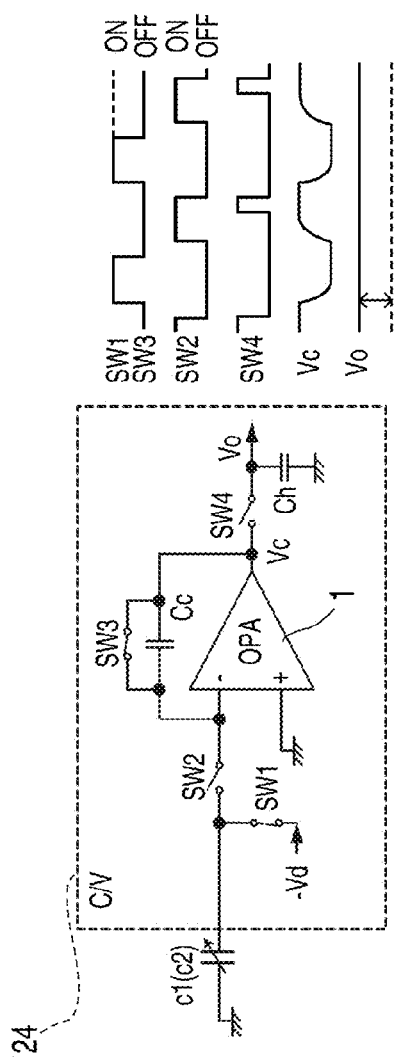
FIG. 6A
FIG. 6B
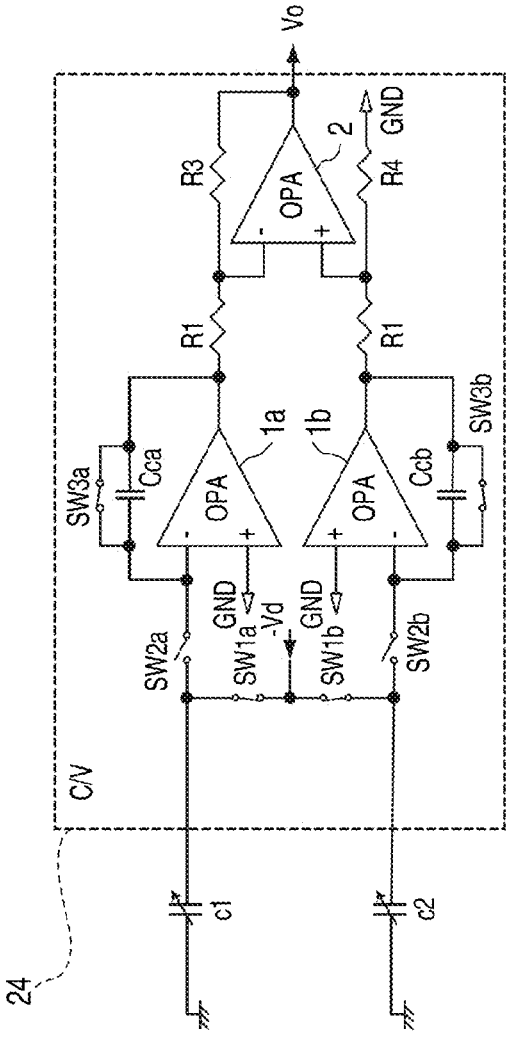
FIG. 6C

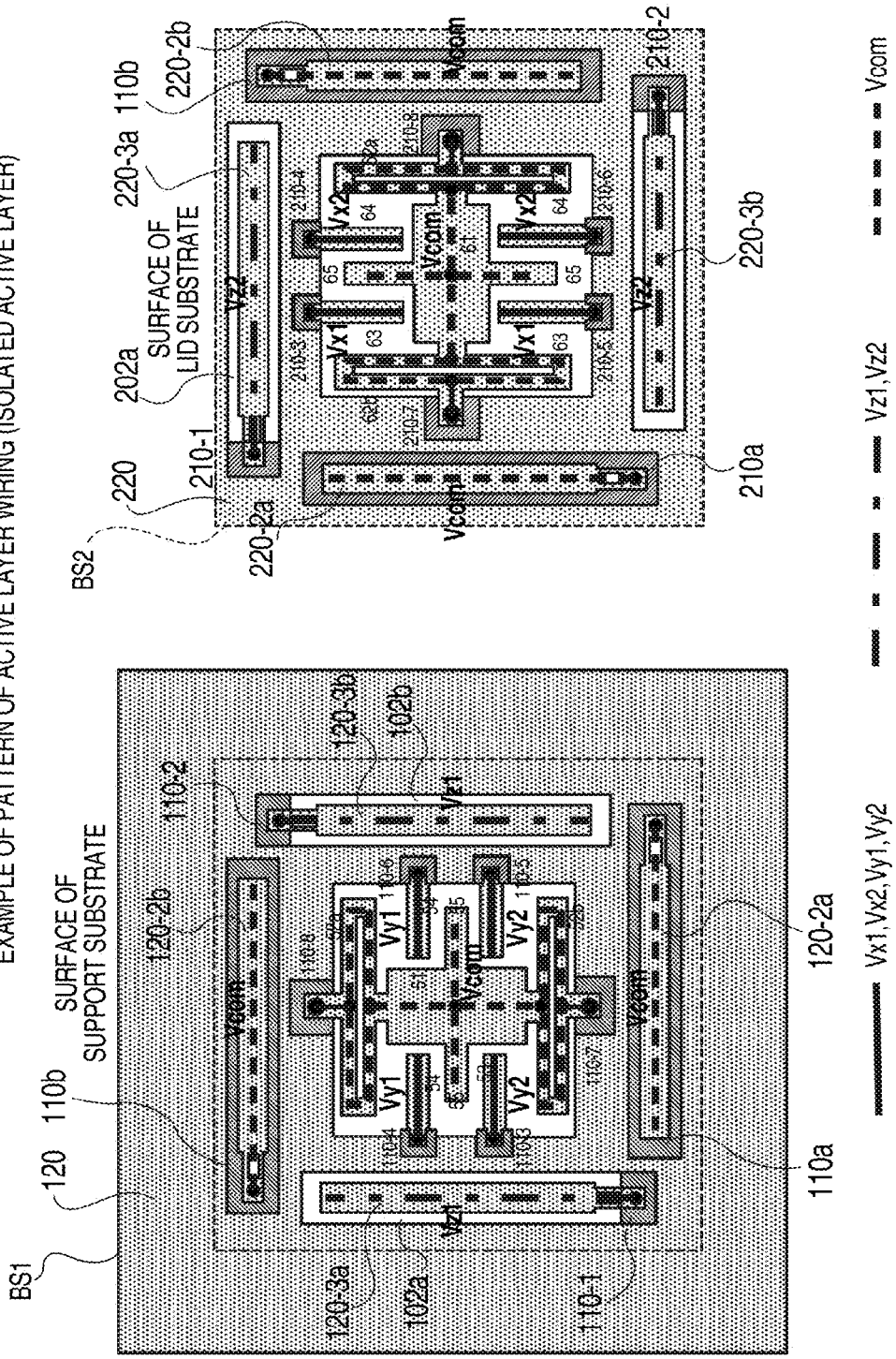

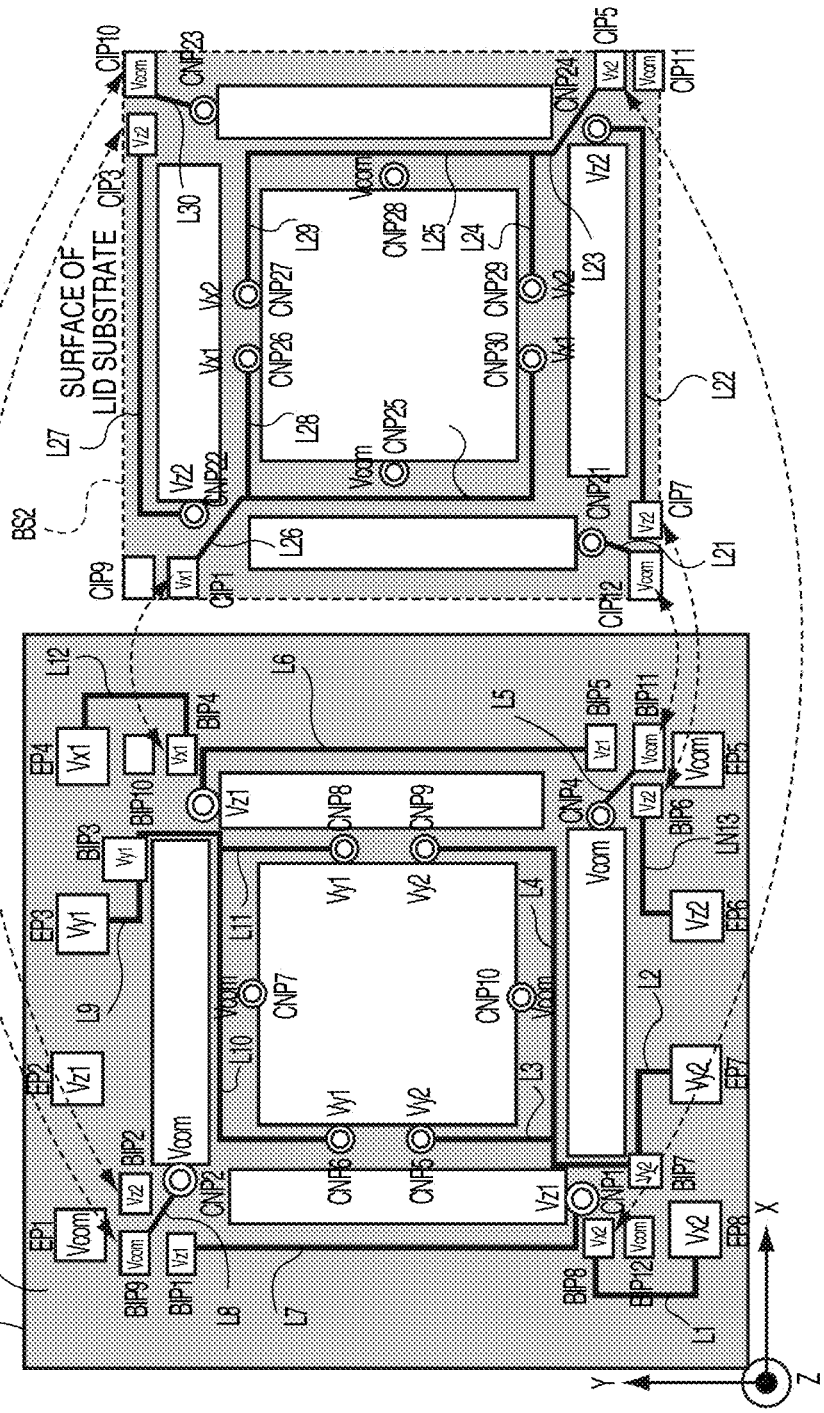

ELEMENT STRUCTURE, INERTIA SENSOR, AND ELECTRONIC DEVICE

BACKGROUND

1. Technical Field

The present invention relates to an element structure, an inertia sensor, and an electronic device.

2. Related Art

Recently, there has been interest in a technology capable of implementing a small-sized and highly sensitive micro-electro mechanical system (MEMS) sensor using a MEMS technology.

For example, JP-A-2004-286535 discloses a semiconductor dynamic quantity sensor using a stacked structure of polysilicon. The semiconductor dynamic quantity sensor uses a single movable structure to detect an acceleration component in the direction of each of three axes (X axis, Y axis, and Z axis).

Further, JP-A-9-113534 discloses a triaxial acceleration sensor in which three acceleration detection elements are integrated on a single silicon substrate. The three acceleration detection elements are simultaneously formed by a process of manufacturing a silicon micro machine. Further, each acceleration sensor is disposed on the single silicon substrate to be adjacent (juxtaposed) to each other.

In the technology disclosed in JP-A-2004-286535, it is necessary to provide three insulating separating structures in a direction perpendicular to a substrate within a structure. As a result, the manufacturing process becomes complicated. Further, since the acceleration in a triaxial direction is detected by a single movable structure, it is difficult to secure independence of detection sensitivity for each axis. In other words, it is undeniable that JP-A-2004-286535 has so-called other axis sensitivity characteristics. Further, there are limitations on improving the sensitivity of the sensor or reducing the sensor size due to the complexity of the structure. That is, since the electrode (polysilicon) is formed by a deposition process and it is difficult to thicken the layer in terms of the process, there are limitations on the improvement of sensor performance. Further, when performing sealing (packaging) of the sensor element, an additional process is required and the manufacturing process becomes more complicated. Further, the sensor size is further increased by forming the sealing body.

Further, in the technology of JP-A-9-113534, since three acceleration sensors are juxtaposed on a single sensor, an increase in the occupied area of the sensor is undeniable. Further, when performing sealing (packaging) of the sensor element, an additional process is required. Further, the sensor size is further increased by forming the sealing body.

SUMMARY

An advantage of some aspects of the invention is, for example, to facilitate the manufacturing of an element structure including a capacitor. Further, another advantage of some aspects of the invention may promote, for example, miniaturization of the element structure.

(1) An aspect of the present invention is directed to an element structure including a first substrate that has a first support layer on which a first sensor element is mounted; and a second substrate that has a second support layer on which a second sensor element is mounted, wherein a surface on which the first sensor element of the first support layer is mounted and a surface on which the second sensor element of the second support layer is mounted face each other.

(2) In one aspect of the element structure of the invention, the first sensor element detects a force in a first direction when seen in plan view, and the second sensor element detects a force in a second direction intersecting with the first direction when seen in plan view.

In this aspect of the invention, the element structure having two sensor elements is configured by disposing the first substrate having the first sensor element and the second substrate having the second sensor element to face each other. Each of the first substrate and the second substrate is disposed in a state facing each other, while being spaced by a predetermined distance. As the first substrate and the second substrate, for example, a semiconductor substrate having multilayer structure in which a plurality of insulating layers or conductor layers, or the like, are formed to be stacked on the semiconductor substrate or a silicon on insulator (SOI) substrate, or a glass substrate, or the like, may be used. Further, the surface on which the first sensor element is provided and the surface on which the second sensor element is provided face each other.

Further, when seen in plan view, in the case in which the forming area of the first sensor element and the forming area of the second sensor element overlap each other, the occupied area is further reduced than in the case in which each sensor is juxtaposed, such that the element structure may be miniaturized. Further, since each of the first sensor element and the second sensor element is spatially separated from each other, mutual interference between the first sensor element and the second sensor element is prevented and the independence of each sensor is secured. Therefore, in the element structure according to the aspect of the invention, the multi-axial sensitivity characteristics do not cause any problem. Further, for example, any one substrate may also be used as a lid body for sealing. In this case, the small-sized sealing structure (sensor package) may be implemented without performing an additional process.

(3) In one aspect of the element structure of the invention, at least one of the first support layer and the second support layer includes an insulating layer and at least one of the first sensor element and the second sensor element is supported via the insulating layer.

According to the structure, insulation between the first substrate and the second substrate is secured. Accordingly, it is not necessary to form a special structure for isolating between the conductor layers disposed on each substrate. That is, when the first substrate and the second substrate face each other at a predetermined distance, the isolation between the conductor layers (conductive members) is essentially realized in a direction (for example, the Z-axis direction) perpendicular to each substrate. As a result, the manufacturing process of the element structure including the capacitor is simplified.

Further, when, for example, the SOI substrate having a thick active layer is used and a movable beam is configured using the thick active layer, the mass (mass of a movable weight) necessary to detect an inertia force (a physical quantity such as acceleration or angular velocity) with high accuracy may be easily secured. Therefore, the sensor sensitivity is easily improved.

(4) In one aspect of the element structure of the invention, the first sensor element includes a first movable weight part supported to the first support layer side of the second support layer, a first movable electrode part formed the first movable weight part, and a first fixing electrode part disposed to face the first movable electrode, when the first movable weight part is applied with the force in the first direction when seen in plan view, the first movable electrode part being displaced in the first direction, and the second sensor element includes a second movable weight part supported to the second support layer side of the first support layer, a second movable electrode part formed the second movable weight part, and a second fixing electrode part disposed to face the second movable electrode, when the movable weight part is applied with a force the second direction when seen in plan view, the second movable electrode part being displaced in the second direction.

In this aspect of the invention, both of the first sensor element and the second sensor element are the capacitor and the capacitor includes the fixing frame part, the elastic deformation part (spring part), the movable electrode part, the movable weight part, and the fixing electrode part. Each part may be collectively formed in a lump by patterning, for example, a single crystal silicon layer (and an insulating layer, or the like, disposed thereon) by photolithography. In addition, a component of the first sensor element has "first" attached to the beginning and a component of the second sensor element has "second" attached to the beginning in order to differentiate therebetween.

For example, one end of the elastic deformation part is connected (fixed) to the fixing frame part and the other end thereof is connected (fixed) to the movable weight part. The movable weight part is supported to the fixing frame part via the elastic deformation part. Since the movable weight part is in a state in which it floats in a cavity part, it may be displaced in a predetermined direction. The movable electrode part is, for example, integrated with the movable weight part and when the movable weight part is displaced by applying a force to the movable weight part, the movable electrode part is also displaced similarly. The movable electrode part, for example, has an end fixed to the movable weight part and is formed to be protruded toward the cavity part around the movable weight part. The fixing electrode part is disposed to face the movable electrode part. The fixing electrode part, for example, has an end fixed to the fixing frame part and is formed to be protruded toward the cavity part around the movable weight part.

Further, the capacitance value of the capacitor configuring the first sensor element is changed by displacing, for example, the first movable weight part in the first direction in a horizontal surface. Meanwhile, the capacitance value of the capacitor configuring the second sensor element is changed by displacing, for example, the second movable weight part in the second direction (for example, an orthogonal direction) intersecting with the first direction in a horizontal surface. That is, the direction of the detection axis of (capacitor configuring) the first sensor element and the direction of the detection axis of (capacitor configuring) the second sensor element is a direction (for example, an orthogonal direction) intersecting with each other. Accordingly, when the element structure according to the aspect of the invention is used, the biaxial acceleration or angular velocity may be detected.

(5) In one aspect of the element structure of the invention, the first sensor element include a first capacitor for the first sensor of which the capacitance value is reduced and a second capacitor for the first sensor of which the capacitance value is increased, when a force in the first direction is applied to the first movable weight part and the second sensor element include a first capacitor for the second sensor of which the capacitance value is reduced and a second capacitor for the second sensor of which the capacitance value is increased, when a force in the second direction is applied to the second movable weight part.

In this aspect of the invention, each of the first sensor element and the second sensor element is provided with two capacitors (first capacitor and second capacitor) in which the direction of the change in the capacitance value is reverse to each other. The first capacitor and the second capacitor may be used as a differential capacitor.

For example, in the first sensor element, when the force (acceleration or Coriolis force) in the first direction is applied to the first movable weight part, for example, the capacitance value of the first capacitor is reduced (variation of the capacitance value of the first capacitor is set to be $-\Delta C$) by expanding the distance (gap between capacitors) between the movable electrode and the fixing electrode configuring the first capacitor. In this configuration according to the aspect of the invention, the capacitance value of the second capacitor is increased (the variation of the capacitance value of the second capacitor is set to be $+\Delta C$) by reducing the distance (the gap between the capacitors) between the movable electrode and the fixing electrode configuring the second capacitor. This is similarly applied even to the second sensor.

A differential detection signal is obtained by taking out the variation in the capacitance values of each of the first capacitor and the second capacitor as the electrical signal. In-phase noise may be offset by differentiating the detection signal. Further, the direction of force (direction in which a force is applied) may also be detected by detecting which one of two detection signals is increased. Further, since the capacitance value of the capacitor for detecting the inertia force is substantially increased and the movement of charge is increased by disposing the plurality of capacitors (first capacitor and second capacitor), signal amplitude of the detection signal may be increased.

(6) In one aspect of the element structure of the invention, at least one of the first substrate and the second substrate is provided with a third sensor element and the third sensor element includes a capacitor for the third sensor element of which the capacitance value is changed when a force in a third direction intersecting with the surface including the first direction and the second direction is generated.

As a result, in addition to the first direction and the second direction, the element structure having detection sensitivity is implemented in the third direction as well. The capacitor as the third sensor element may be formed by disposing, for example, the conductor layers extending in the third direction to face each other, while being spaced away from each other by a predetermined distance, using a side of one conductor layer as the fixing electrode, and a side of the other conductor layer as the movable electrode.

(7) In one aspect of the element structure of the invention, the third sensor element includes the first movable beam as a movable electrode of which one end is supported to the first support layer side of the second support layer, the other end has a void part provided therearround, and the first fixing part as a fixing electrode that is fixed to the second support layer side of the first support layer, wherein the first fixing part part is disposed to face the first movable beam, with a gap therebetween.

Even in this aspect of the invention, the third sensor element having detection sensitivity in the third direction is provided. However, in the aspect (6) of the invention, although the third sensor is provided on a single substrate, in the aspect of the invention, the third sensor is formed by combining the first substrate and the second substrate and therefore, the aspect (7) of the invention and the aspect (6) of the invention differ in terms of the method of implementing the third sensor.

In the aspect of the invention, the first movable beam as the first movable electrode is provided on the first substrate and the first fixing part as the first fixing electrode is further provided on the second substrate. In addition, the reason for attaching "first" to the beginning is for formatting reasons to avoid confusion between components due to the addition of components in the following aspect (8) (the numeral ""first"" is not necessary when this aspect is only referred to).

In the aspect of the invention, when the first substrate and the second substrate are disposed to face each other, while being spaced by, for example, the predetermined distance, the first movable beam and the first fixing part are in a state facing each other (overlapping state when seen in plan view), such that a parallel plate capacitor is formed. When a force (acceleration or Coriolis force) is applied in a direction (that is, a third direction) perpendicular to each substrate, the distance (the gap between the capacitors) between the first movable electrode and the first fixing electrode is changed by displacement of the first movable beam and therefore, the capacitance value is changed. Therefore, the acceleration or Coriolis force (rotation angular velocity) in the third direction may be detected.

Each of the first substrate and the second substrate is disposed in a state opposite to each other, while being spaced by the predetermined distance and therefore, the insulation between the first substrate and the second substrate is secured. Accordingly, it is not necessary to form a special structure for isolating between the conductor layers disposed on each substrate. That is, when the first substrate and the second substrate face each other at a predetermined distance, the isolation between the conductor layers (conductive members) is essentially realized in the direction (for example, the Z-axis direction) perpendicular to each substrate. As a result, the manufacturing process of the element structure including the capacitor is simplified.

Further, when, for example, the SOI substrate having a thick active layer is used and the movable beam is configured using the thick active layer, the mass (mass of a movable weight) necessary to detect an inertia force (a physical quantity such as acceleration or angular velocity) with high accuracy may be easily secured. Therefore, the sensor sensitivity is easily improved.

(8) In one aspect of the element structure of the invention, the third sensor element has a second fixing part as a fixing electrode that is fixed to the first support layer side of the second support layer, and a second movable beam as a movable electrode of which one end is supported to the second support layer side of the first support layer, the other end has a void part provided therearound, wherein the second fixing part is disposed to face the second movable beam, with a gap therebetween.

In this aspect of the invention, the second fixing part as the second fixing electrode is provided on the first substrate and the second movable beam as the second movable electrode is further provided on the second substrate. That is, in the aspect of the invention, the third sensor includes two capacitors (a first capacitor and a second capacitor). For the first capacitor for the third sensor element, the first movable electrode is disposed on the first substrate side and the first fixing electrode is disposed on the second substrate side. Meanwhile, for the second capacitor for the third sensor element, the second movable electrode is disposed on the second substrate side and the second fixing electrode is disposed on the first substrate side. That is, in the first capacitor for the third sensor and the second capacitor for the third sensor, the positional relationship between the movable electrode and the fixing electrode becomes reversed. Therefore, the first capacitor for the third sensor and the second capacitor for the third sensor may be used as the differential capacitors.

When a force (acceleration or Coriolis force) is applied in a direction (for example, the Z-axis direction) perpendicular to each substrate, for example, in the first capacitor, the capacitance value of the first capacitor is reduced by increasing the distance (gap between capacitors) between the first movable electrode and the first fixing electrode (the variation of the capacitance value of the first capacitor is set to be $-\Delta C$). In this case, in the second capacitor, the capacitance value of the second capacitor is increased by reducing the distance (gap between the capacitors) between the second movable electrode and the second fixing electrode (variation of the capacitance value of the second capacitor is set to be $+\Delta C$).

The differential detection signal is obtained by taking out the variation in the capacitance values of each of the first capacitor and the second capacitor as the electrical signal. In-phase noise may be offset by differentiating the detection signal. Further, the direction of force (direction in which force is applied) may also be detected by detecting which one of two detection signals is increased. Further, since the capacitance value of the capacitor for detecting the inertia force is substantially increased and the movement of charge is increased by disposing the plurality of capacitors (that is, first capacitor and second capacitor), signal amplitude of the detection signal may be increased.

Further, when the structure according to the aspect of the invention is used, a crosstalk (interaction) due to coupling between the first capacitor and the second capacitor may be practically reduced to a level that does not cause any problem. For example, the case in which the fixing electrode of the capacitor is used as a common potential and the detection signal is obtained from the movable electrode is considered. Generally, as the element structure is miniaturized, the distance between the first capacitor and the second capacitor is shortened, coupling due to parasitic capacitance may easily occur between the movable capacitances of each capacitor.

However, according to the structure of the element structure of the aspect of the invention, as described above, the first movable electrode of the first capacitor is disposed on the first substrate side, while the second movable electrode of the second capacitor is disposed on the second substrate side.

Since each substrate is spaced by the predetermined distance in a direction (for example, the Z-axis direction) perpendicular to the substrate, even though the first movable electrode and the second movable electrode are disposed to be adjacent to each other, the distance between the first movable electrode and the second movable electrode is secured, such that crosstalk (interaction) due to coupling between the first capacitor and the second capacitor is sufficiently reduced. Accordingly, according to the aspect of the invention, the reduction in the detection sensitivity of the third sensor element may be suppressed while miniaturizing the element structure.

(9) In one aspect of the element structure of the invention, the third sensor element is disposed around the forming area of at least one of the first sensor element and the second sensor element when seen in plan view.

This aspect of the invention is associated with the layout of the third sensor element in the first substrate and the second substrate. As described above, the first sensor element and the second sensor element overlap each other when seen in plan view, and the element structure may be miniaturized. In the aspect of the invention, the third sensor element is further disposed in an empty area around the forming area of the first sensor element and the second sensor element when seen in plan view.

For example, the entire area in which the first substrate and the second substrate overlap each other when seen in plan view becomes the element forming area.

The first sensor element and the second sensor element are disposed, for example, at the central portion of the element forming area when seen in plan view and the component (fixing part or movable beam) of the third sensor element may adopt the layout in order to be dispersed and disposed in the empty area around the central portion thereof. Therefore, a layout which is used without a wasted element forming area is formed. Therefore, the micro element structure (triaxial element structure) in which each of the three axes has detection sensitivity may be obtained.

(10) In one aspect of the element structure of the invention, a spacer member is disposed between the first substrate and the second substrate.

In this aspect of the invention, the spacer member is disposed between the first substrate and the second substrate. For example, the second substrate may be held on the first substrate, while being spaced by the predetermined distance, by the spacer member. As the spacer member, an insulating spacer member configured of only an insulating material may be used and a conductive spacer member including conductive materials as components may be used. Further, both of the insulating spacer member and the conductive spacer member may be used.

(11) In one aspect of the element structure of the invention, a sealing body having a space formed therein is formed by the first substrate, the second substrate, and the space member.

For example, the first substrate may be used as a support substrate that supports the second substrate, the second substrate may be used as a lid substrate configuring a lid part of the sealing body, and a first spacer member may be used as a side wall for airtight sealing. After the first spacer member having a closed linear shape when seen in plan view is formed on at least one of the first substrate and the second substrate, the element structure including the sealing body (package) is formed by bonding the first substrate and the second substrate face-to-face. According to the aspect of the invention, the additional manufacturing process for configuring the sealing body (package) is not required, such that the manufacturing process of the element structure is simplified.

(12) In one aspect of the element structure of the invention, the spacer member includes a resin core part formed using a resin and a conductor layer formed to cover at least a portion of a surface of the resin core part.

According to this aspect of the invention, the conductive spacer member (spacer including the conductive material as a component) having the resin core structure including the resin core part (resin core) as the spacer member and the conductor layer formed to cover at least a portion of the surface of the resin core part (resin core) is used.

As the resin, for example, a thermosetting resin such as resin may be used. The resin is hardened and has rigidity, which serves to stably support (support at the predetermined distance) the second substrate on the first substrate. Further, the conductor layer is formed to cover (to contact at least the resin core) at least a portion of the surface of the resin core part.

Further, the thickness of the conductor layer is thin (further, when the first substrate is bonded to the second substrate, there may be a case in which the apex portion of the resin core is almost exposed), such that the distance between the first substrate and the second substrate may be accurately determined as the height of the resin core.

Further, since the conductor layer covering at least a portion of the resin core is provided, for example, the conductor on the first substrate side and the conductor on the second substrate side may also be connected with each other via the conductor layer. Further, when, for example, the conductive spacer having the resin core structure is interposed between the insulating layer of the first substrate side and the insulating layer of the second substrate, it does not exhibit a function to provide electrical conduction of the conductor layer covering at least a portion of the resin core. In this case, the conductive spacer having the resin core structure may substantially serve as the insulating spacer.

(13) Another aspect of the invention is directed to an inertia sensor including a signal processing circuit that processes electrical signals output from the element structure.

The element structure is compact and has high detection performance. Therefore, a small-sized and high sensitivity inertia sensor may be implemented. Further, the inertia sensor having a sealing body (package) and high reliability (that is, excellent moisture resistance, or the like) may be obtained. An example of the inertia sensor may include a capacitive acceleration sensor and a Gyro sensor (angular velocity sensor), and the like.

(14) Still another aspect of the invention is directed to an electronic device having the above-mentioned element structure.

As a result, a small-sized and high-performance (high reliability) electronic device (for example, a game controller or portable terminal, or the like) may be obtained.

BRIEF DESCRIPTION OF THE DRAWINGS

The invention will be described with reference to the accompanying drawings, wherein like numbers reference like elements.

FIGS. 6A to 6C are diagrams for illustrating a configuration and an operation of a C/V conversion circuit.

FIGS. 16A and 16B are diagrams showing an example of patterns of active layer wirings (isolated active layers) in the first substrate and the second substrate.

FIGS. 17A and 17B are diagrams showing an example of a wiring pattern of a first layer wiring in the first substrate and the second substrate.

DESCRIPTION OF EXEMPLARY EMBODIMENTS

Figure 1A:
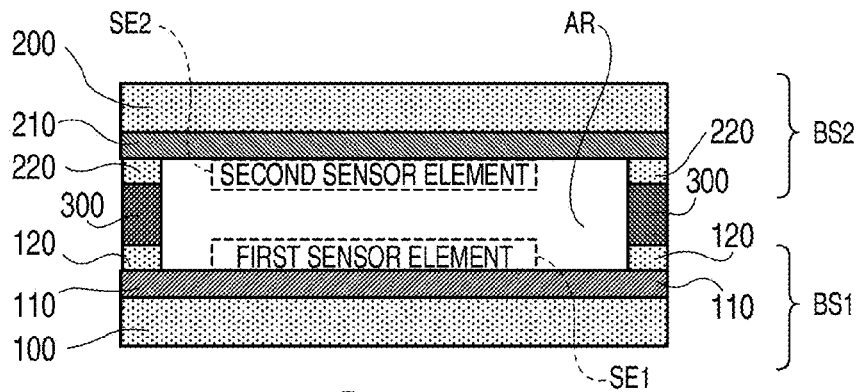
FIGS. 1A to 1D are structure examples of an element structure including a capacitor.

Hereinafter, exemplary embodiments of the invention will be described with reference to the accompanying drawings. Exemplary embodiments of the invention to be described below does not excessively limit the contents according to the invention in the appended claims, and the overall configuration disclosed in the exemplary embodiments of the invention is not necessarily essential as a solving means according to the invention.

First Embodiment

FIGS. 1A to 1D show a structure example of an element structure including a capacitor. In an example of FIG. 1A, an element structure is configured to include a first substrate BS1 and a second substrate BS2 that are disposed to face each other. As the first substrate BS1 and the second substrate BS2, for example, a semiconductor substrate having multilayer structure in which a plurality of insulating layers or conductor layers, or the like, are formed to be stacked on the semiconductor substrate, a silicon on insulator (SOI) substrate, or a glass substrate, or the like, may be used.

The first substrate BS1 includes a first support layer (for example, a silicon single crystal layer) 100, a first insulating layer (for example, a silicon oxide layer) 110 formed on the first support layer 100, and a first sensor element SE1. In addition, there may be the case in which there is no need to dispose the first insulating layer (for example, a silicon oxide layer) 110. For example, when a glass substrate is used as the first support layer 100, since the first support layer 100 itself is made of an insulating material, there may be no need to dispose the first insulating layer (for example, a silicon oxide layer) 110.

The first sensor element SE1 may be formed by patterning a first active layer 120 (for example, a silicon single crystal layer) formed on the first insulating layer 110 (or, disposed above the first support layer 100). In addition, a multilayer structure in which an interlayer dielectric layer of at least one layer and a conductor layer are stacked on the silicon single crystal layer as the first active layer 120 is formed and (at least one of components of) the first sensor element SE1 may be formed by patterning the multilayer structure.

In addition, the second substrate BS2 includes a second support layer (for example, a silicon single crystal layer) 200, a second insulating layer (for example, a silicon oxide layer) 210 formed on the second support layer 200, and a second sensor element SE2. In addition, there may be the case in which there is no need to dispose the second insulating layer (for example, a silicon oxide layer) 210. For example, when a glass substrate is used as the second support layer 200, there may be no need to dispose the second insulating layer (for example, a silicon oxide layer) 210.

The second sensor element SE2 may be configured by patterning a second active layer 220 (for example, a silicon single crystal layer) formed on, for example, the second insulating layer 210. In addition, the multilayer structure in which the interlayer dielectric layer of at least one layer and the conductor layer are stacked on the silicon single crystal layer as the second active layer 220 is formed and (at least one of components of) the second sensor element SE2 may be formed by patterning the multilayer structure.

The second substrate BS2 is disposed on the first substrate BS1 via a spacer member (spacer) 300 in a state in which the first sensor element SE1 and the second sensor element SE2 face each other. For example, the first substrate BS1 and the second substrate BS2 are bonded to each other via the spacer member 300 in a state in which the first sensor element SE1 and the second sensor element SE2 face each other.

For example, the second substrate BS2 is held on the first substrate BS1, while being spaced by the predetermined distance, by the spacer member 300. As the spacer member 300, for example, an insulating spacer member configured of only an insulating material may be used and a conductive spacer member including conductive materials as a component may be used. Further, both of the insulating spacer member and the conductive spacer member may be used.

The first sensor element SE1 and the second sensor element SE2 face each other and thus, the forming area of the first sensor element and the forming area of the second sensor element overlap with each other when seen in plan view.

A space AR is formed within the element structure. The element structure configured as described above may be used as a component of a capacitive MEMS acceleration sensor or an inertia sensor such as a capacitive MEMS Gyro sensor, or the like. For example, when the movable electrode part is displaced due to the acceleration, the capacitance value of a variable capacitor is changed. The acceleration may be detected by converting the change in the capacitance value into an electrical signal by a C/V conversion circuit (a capacitance/voltage conversion circuit). Similarly, when the movable electrode part is displaced by the Coriolis force generated by rotation, the capacitance value of the variable capacitor is changed. The angular velocity may be detected by converting the change in the capacitance value into an electrical signal by a C/V conversion circuit. Further, in the Gyro sensor, the element structure is attached to, for example, a rotating body (a rotating mass body: not shown) that rotates at a predetermined rotational frequency.

According to the element structure shown in FIG. 1A, the insulation between the first substrate BS1 and the second substrate BS2 is secured. Accordingly, it is not necessary to form a special structure for isolating between the conductor layers disposed on each substrate BS1 and BS2. That is, when the first substrate BS1 and the second substrate BS2 face each other at a predetermined distance, the isolation between the conductor layers (conductive members) is essentially realized in the direction (for example, the Z-axis direction) perpendicular to each substrate. As a result, the manufacturing process of the element structure including the capacitor is simplified.

Further, when, for example, the SOI substrate having a thick active layer is used and the movable beam is configured using the thick active layer, the mass (the mass of a movable weight) necessary to detect an inertia force (substantially, a physical quantity such as acceleration or angular velocity) with high accuracy may be easily secured. Therefore, the sensor sensitivity is easily improved.

Further, when seen in plan view, in the case in which a forming area of the first sensor element SE1 and a forming area of the second sensor element SE2 overlap each other, the occupied area of the element is further reduced than the case in which each sensor is juxtaposed, such that the element structure may be miniaturized.

Further, since each of the first sensor element SE1 and the second sensor element SE2 is spatially separated from each other, the mutual interference between the first sensor element SE1 and the second sensor element SE2 is prevented and the independence of each sensor is secured. Therefore, in the element structure according to the embodiment of the invention, the multi-axial sensitivity characteristics do not cause any problem.

Further, for example, any one substrate may also be used as a lid body for sealing. In this case, the small-sized sealing structure (sensor package) may be implemented without performing an additional process.

Figure 1B:
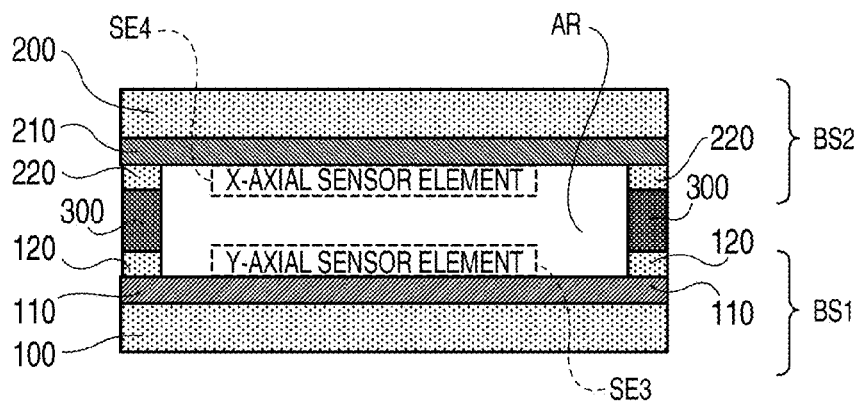

In the element structure shown in FIG. 1B, a Y-axial sensor element SE3 and an X-axial sensor element SE4 are disposed. Both of the Y-axial sensor element SE3 as the first sensor element and the X-axial sensor element as the second sensor element are a capacitor.

Figures 1C, 1D:
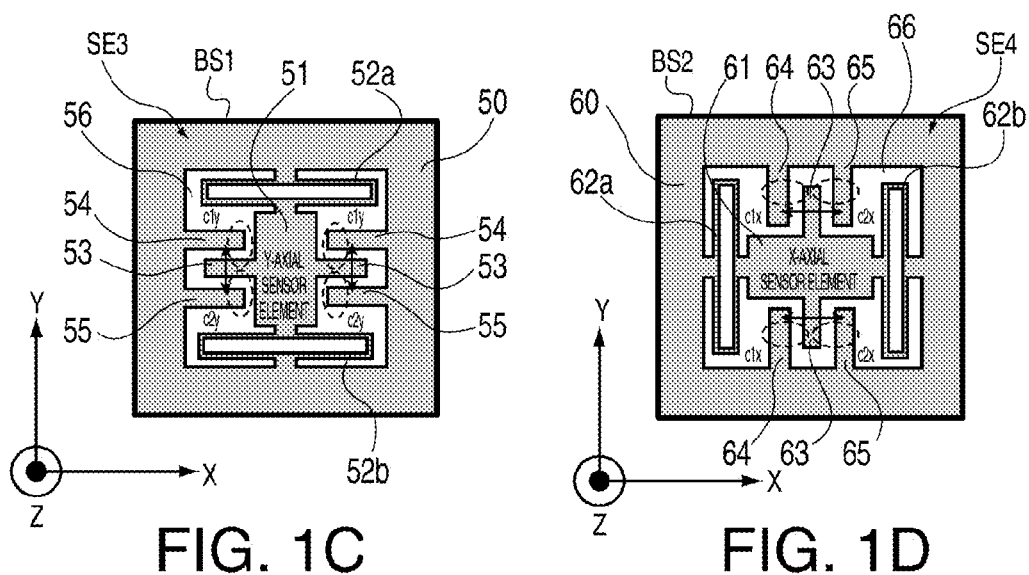

FIG. 1C is a plan view showing a configuration example of the Y-axial sensor element (a Y directional sensor element) SE3 and FIG. 1D is a plan view showing a configuration example of the X-axial sensor element (an X directional sensor element) SE4. Although the Y-axial sensor element SE3 shown in FIG. 1C and the X-axial sensor element SE4 shown in FIG. 1D have the same configuration, the detection axes are different from each other. The detection axis of the Y-axial sensor element SE3 shown in FIG. 1C is the Y axis and the detection axis of the X-axial sensor element SE3 shown in FIG. 1D is the X axis orthogonal to the Y axis.

The Y-axial sensor element SE3 as the first sensor element shown in FIG. 1C may be formed by patterning the active layer 120 of the first substrate BS1 using, for example, photolithography.

The Y-axial sensor element SE3 of FIG. 1C includes a first fixing frame part 50, a first movable weight part 51 that is supported to the first fixing frame part 50 via first elastic deformation parts (spring parts) 52a and 52b and has a first cavity part 56 therearound, a first movable electrode part 53 that is integrally formed with the first movable weight part 51 and displaces together with the first movable weight part 51, and a pair of first fixing electrode parts 54 and 55 having one end fixed to the first fixing frame part 50 and disposed to face the first movable electrode part 53. When seen in plan view, when the force in the first direction (that is, the force in the Y-axis direction) is applied to the first movable weight part 54, the first movable electrode part 54 is displaced in the first direction (the Y-axis direction).

The ends of the elastic deformation parts (the spring parts) 52a and 52b are connected (fixed) to the fixing frame part 50 and the other ends thereof are connected (fixed) to the movable weight part 51. The movable weight part 51 is supported to the fixing frame part 50 via the elastic deformation parts 52a and 52b. Since the movable weight part 51 is in a state in which it floats in the cavity part 56, it may be displaced in a predetermined direction (in an example of FIG. 1C, the Y-axis direction). The movable electrode part 53 is, for example, integrally formed with the movable weight part 51 and when the movable weight part 51 is displaced by applying a force to the movable weight part 51, the movable electrode part 53 is also displaced similarly. The movable electrode part 53 has, for example, an end fixed to the movable weight part 51 and is formed to be protruded toward a cavity part 56 disposed around the movable weight part 51. The pair of fixing electrode parts 54 and 55 is disposed to face the movable electrode part 53. The pair of fixing electrode parts 54 and 55 has, for example, an end fixed to the movable frame part 50 and is formed to be protruded toward the cavity part 56 disposed around the movable electrode part 51.

In the example of FIG. 1C, the fixing electrode parts 54 and 55 and the movable electrode part 53 configure a comb-shaped electrode. Two capacitors (differential capacitors) $c1y$ and $c2y$ are constituted by the comb-shaped electrode. When the distance (the gap between capacitors) between the movable electrode part 53 and the fixing electrode part 54 is reduced and a capacitance value of a first capacitor $c1y$ is increased accordingly (the increase of the capacitance value is set to be $+\Delta C$), the distance between the movable electrode part 53 and the fixing electrode part 55 is increased and a capacitance value of a second capacitor $c2y$ is reduced accordingly (the reduction in the capacitance value is set to be $-\Delta C$). Therefore, the first capacitor $c1y$ and the second capacitor $c2y$ become the differential capacitors.

Therefore, the differential detection signal is obtained by converting the variation in the capacitance values of each of the first capacitor $c1y$ and the second capacitor $c2y$ into the electrical signal. In-phase noise may be offset by differentiating the detection signal. Further, the direction of force (the direction in which a force is applied) may also be detected by detecting which one of two detection signals is increased. Further, since the capacitance value of the capacitor for detecting the inertia force is substantially increased and the movement of charge is increased by disposing the plurality of capacitors (the first capacitor $c1y$ and the second capacitor $c2y$), signal amplitude of the detection signal may be increased.

The X-axial sensor element SE2 shown in FIG. 1D has like configuration. In other words, the X-axial sensor element SE2 includes a second fixing frame part 60, a second movable weight part 61 that is supported to the second fixing frame part 60 via second elastic deformation parts 62a and 62b and having a second capacity part 66 formed therearound, a second movable electrode part 63 that is integrally formed with the second movable weight part 61 and is displaced together with the second movable weight part 61, second fixing electrode parts 64 and 65 that have one end fixed to the second fixing frame part 60 and are disposed to face the second movable electrode part 63, and when a force is applied to the movable weight part 61 in a second direction (herein, the X-axis direction) intersecting with the first direction when seen in plan view, the second movable electrode part 63 is displaced in the second direction (X-axis direction).

In addition, in the above description, the components of the Y-axis sensor element SE3 as the first sensor element has "first" attached to the beginning and the components of the X-axis sensor element SE4 as the second sensor element has "second" attached to the beginning in order to differentiate therebetween.

As described above, the capacitance values of the capacitors c1y and c2y configuring the Y-axis sensor element SE3 is changed in response to the displacement of the first movable weight part 51 in the first direction (Y-axis direction) within, for example, a horizontal surface. Meanwhile, capacitance values of capacitors c1x and c2x configuring the X-axis sensor element SE4 is changed in response to the displacement of the second movable weight part in the second direction intersecting with the first direction (herein, an orthogonal direction, that is, the X-axis direction) within, for example, a horizontal surface.

That is, the direction of the detection axis of (the capacitor configuring) the first sensor element and the direction of the detection axis of (the capacitor configuring) the second sensor element are a direction (for example, an orthogonal direction) intersecting with each other. Accordingly, when the element structure shown in FIGS. 1B to 1D is used, the biaxial acceleration or angular velocity may be detected.

Figure 2:
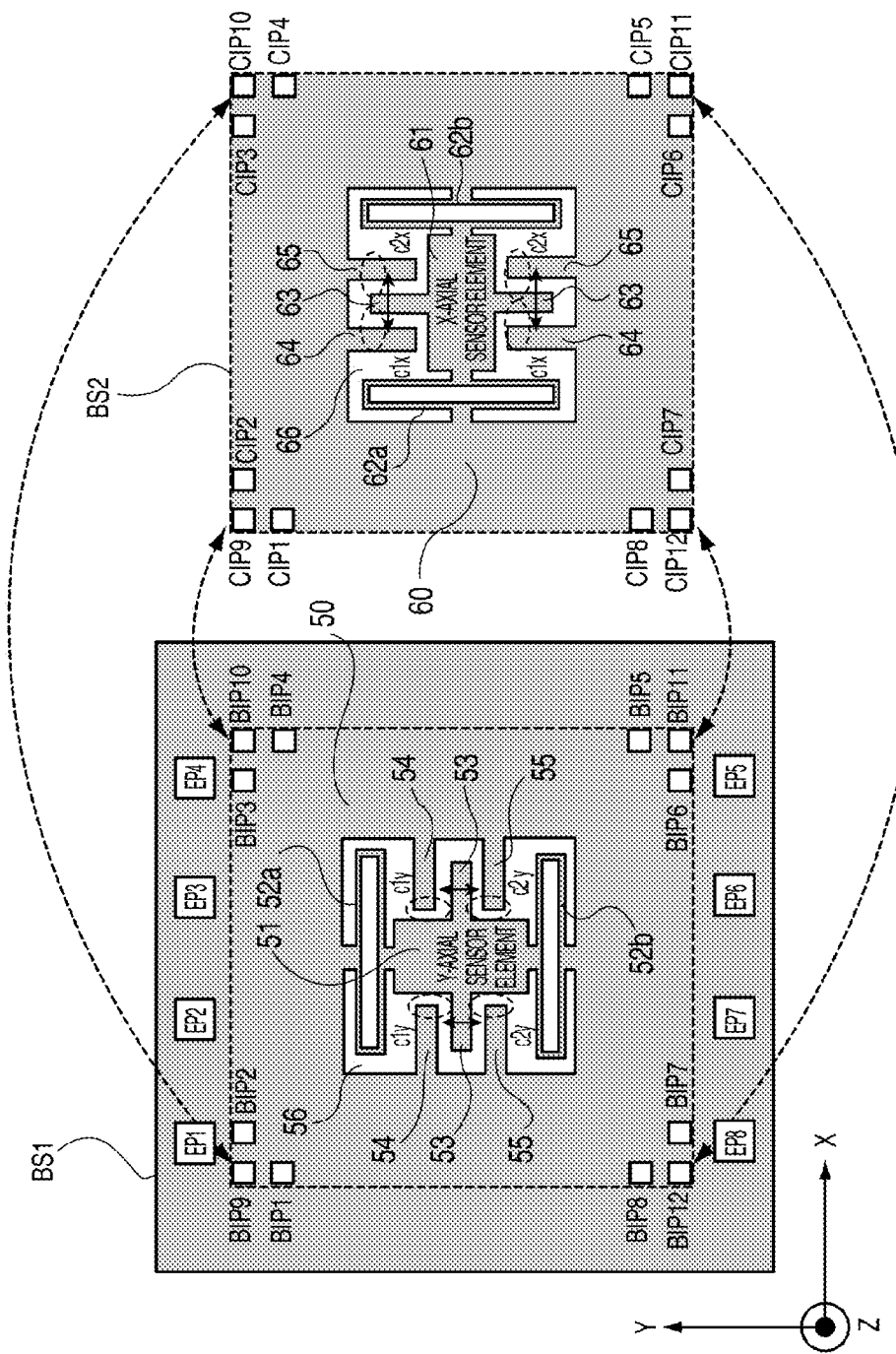
FIG. 2 is a plan view showing a correspondence relationship between respective substrates when a first substrate including a Y-axial sensor element and a second substrate including an X-axial sensor element are disposed to be opposite to each other.

FIG. 2 shows a plan view of a correspondence relationship between respective substrates when the first substrate including the Y-axial sensor element and the second substrate including the X-axial sensor element are disposed to be opposite to each other. In FIG. 2, components similar to FIG. 1 are denoted by like reference numerals (this may also be applied to the following drawings).

As shown on the left of FIG. 2, inner pads (connection terminals disposed at the inside of an element forming area shown being surrounded by a dotted line) BIP1 to BIP12 are disposed on the first substrate BS1 and outer pads (connection terminals disposed at the outside of an element forming area shown by being surrounded by a dotted line) EP1 to EP8 are also disposed thereon.

Meanwhile, the pads (connection terminals) CIP1 to CIP12 are disposed on the second substrate BS2. Each of the pads (connection terminals) CIP1 to CIP12 correspond to each of the inner pads BIP1 to BIP12 of the first substrate BS1. When the first substrate BS1 and the second substrate BS2 are disposed to overlap each other, the corresponding pads overlap each other, when seen in plan view.

Figure 3A:
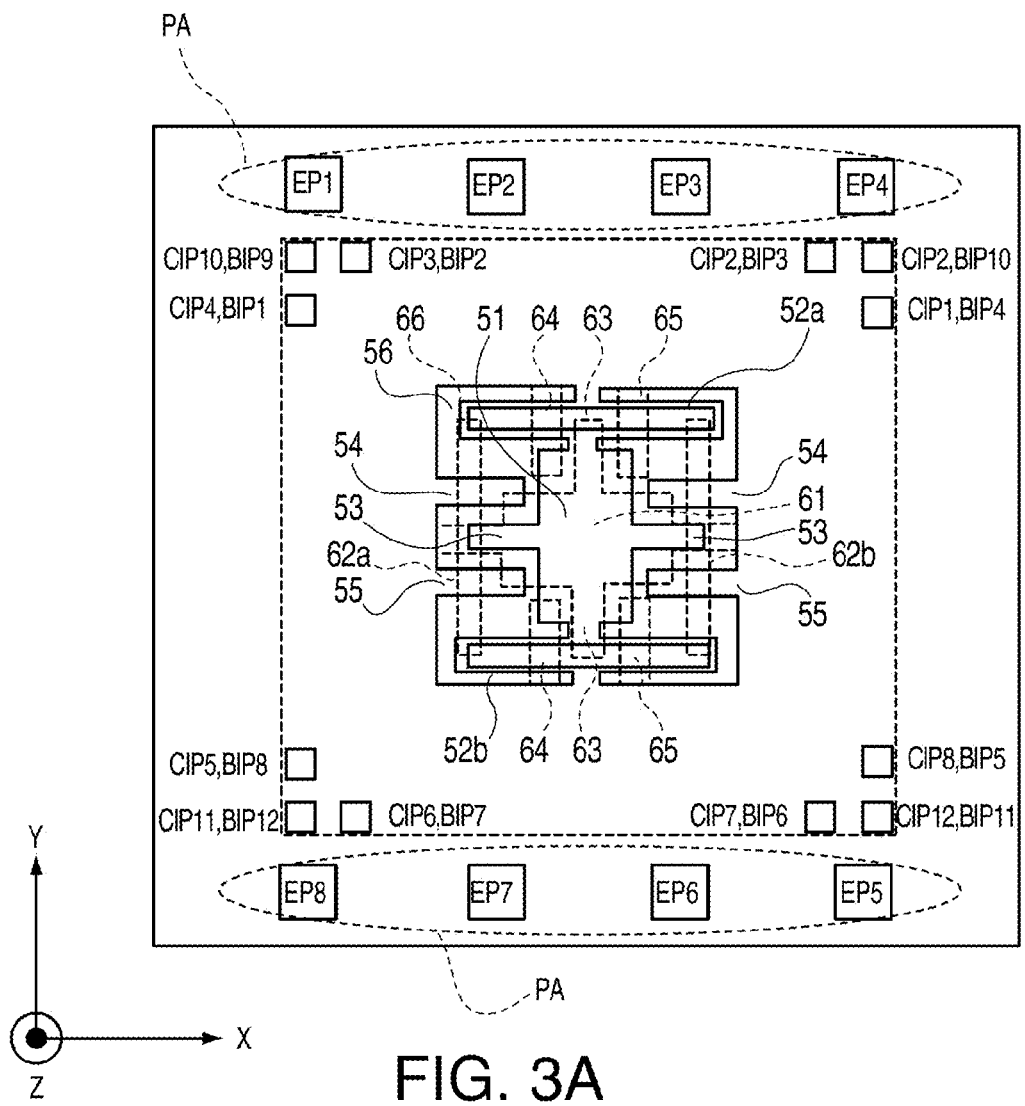
FIGS. 3A and 3B are diagrams showing a state in which the first substrate and the second substrate shown in FIG. 2 are disposed to face each other.
Figure 3B:
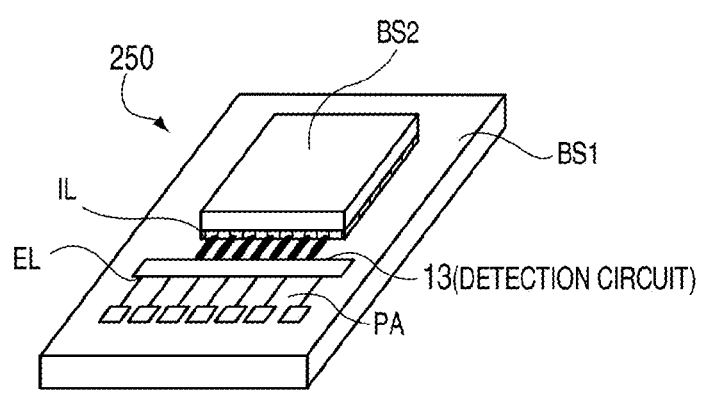

FIGS. 3A and 3B show a state in which the first substrate and the second substrate shown in FIG. 2 are disposed to face each other. FIG. 3A is a plan view of the element structure configured by disposing the first substrate and the second substrate shown in FIG. 2 in order to face each other and FIG. 3B is a perspective view showing one example of the overall configuration of the element structure.

In FIG. 3A, the Y-axial sensor element disposed on the first substrate BS1 is shown by a solid line and the X-axial sensor element disposed on the second substrate BS2 is shown by a dotted line. Further, the outer pads EP1 to EP8 shown in FIG. 3A correspond to the pad PA shown in FIG. 3B.

In the example of FIG. 3B, the second substrate BS2 as a lid substrate is fixed to the first substrate BS1 as a support substrate and an inertia sensor 250 including the sealing body (herein, an airtight sealing package) is formed. The surface of the first substrate BS1 is provided with a pad (an external connection terminal) PA.

The variable capacitors c1 and c2, or the like and the detection circuit 13 that are disposed in the sealing body are connected with each other via a wiring IL. The detection circuit 13 and the pad PA are connected with each other by a wiring EL. Further, when the plurality of sensors are mounted in the sealing body, output signals from each sensor are drawn to the detection circuit 13 via the wiring IL. Further, in the example of FIG. 3B, the detection circuit 13 (including a signal processing circuit) is mounted on the first substrate BS1 (however, this is an example and there is no limitation to the example). The high-functional inertia sensor (MEMS inertia sensor) having a signal processing function may be implemented by mounting the detection circuit 13 on the first substrate BS1.

For example, after the frame-shaped spacer member 300 (see FIGS. 1A and 1B) having a closed linear shape when being seen in plan view is formed on at least one of the first substrate BS1 and the second substrate BS2, the element structure including the sealing body (airtight sealing package) having a space AR therein may be formed by bonding the first substrate BS1 and the second substrate BS2 face-to-face. When adopting the structure, an additional manufacturing process for configuring the sealing body (package) is not required. Therefore, the manufacturing process of the element structure may be simplified.

Figure 4:
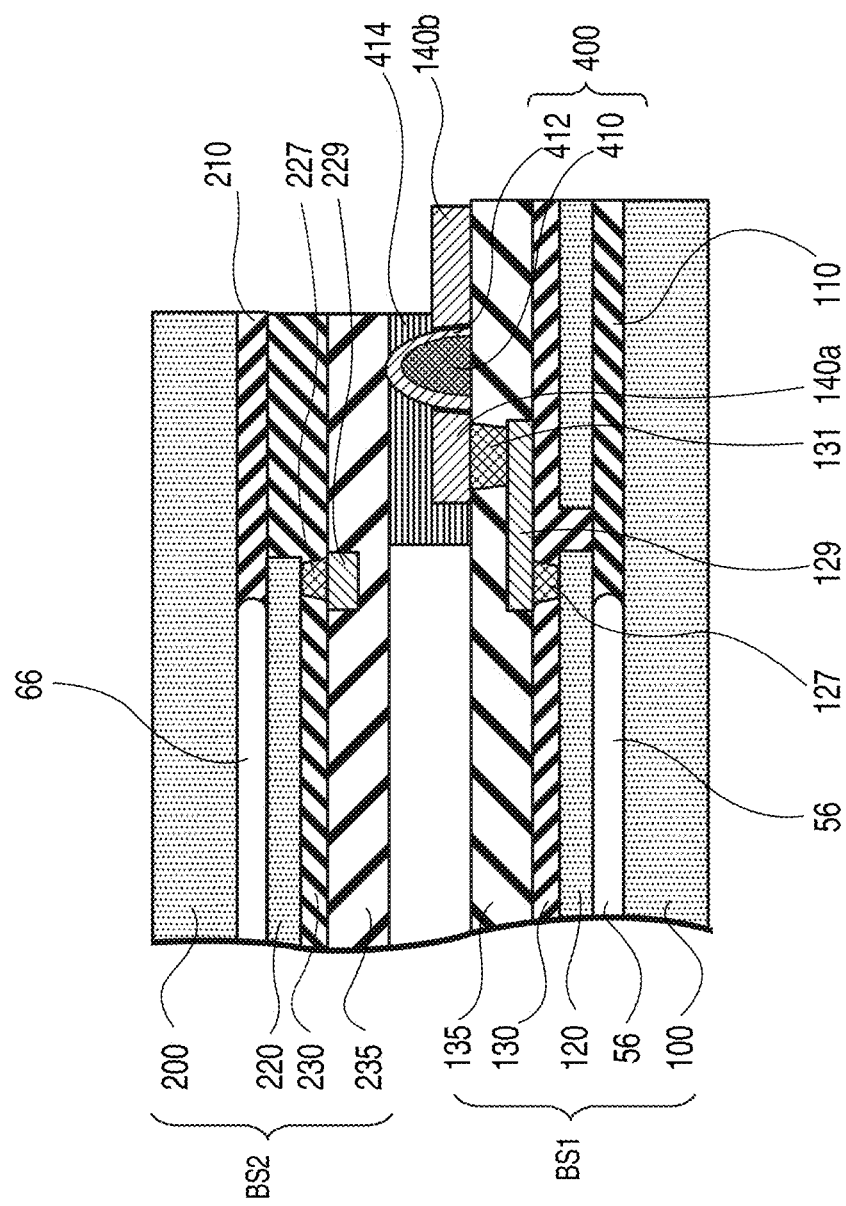
FIG. 4 is a diagram showing an example of a sectional structure of an element structure having a sealing structure.

FIG. 4 shows an example of a sectional structure of the element structure having a sealing structure. As shown in FIG. 4, the first substrate BS1 and the second substrate BS2 are bonded to each other by an adhesive film (herein, a non-conductive film NCF) 414.

The first substrate BS1 includes a first support layer 100, a first insulating layer 110, a first active layer 120, an insulating layer 130 disposed on the first active layer, an interlayer dielectric layer 135, a contact plug 127 made of tungsten or the like, a first conductor layer 129, a contact plug 131, a second conductor layer (inner wiring) 140a, an outer wiring 140b, and a conductive spacer member having a resin core structure (including a resin core 410 and a patterned conductor layer 412). Further, the first insulating layer 110 is optionally removed, such that the cavity part 56 is formed.

Meanwhile, the second substrate BS2 includes the second support layer 200, the second insulating layer 210, the second active layer 220, the insulating layer 230 disposed on the second active layer, a conductor layer (herein, a metal layer made of aluminum, or the like) 229 optionally formed on the insulating layer 230, and a contact plug 227 made of tungsten, or the like. Further, the second insulating layer 210 is optionally removed, such that the cavity part 66 is formed.

In the element structure shown in FIG. 4, as described above, the conductive spacer member (a spacer which includes the conductive material as a component) having the resin core structure including the resin core part (resin core) 410 as the spacer member and the conductor layer 414 formed to cover at least a portion of a surface of the resin core part (resin core), is used.

As the resin, for example, a thermosetting resin such as resin may be used. The resin is hardened and has rigidity, which serves to stably support (support at the predetermined distance) the second substrate BS2 on the first substrate BS1. Further, the conductor layer is formed to cover (to contact at least the resin core) at least a portion of the surface of the resin core part.

Further, the thickness of the conductor layer is thin (further, when the first substrate is bonded to the second substrate, there may be a case in which the apex portion of the resin core is almost exposed) such that the distance between the first substrate and the second substrate may be accurately determined as the height of the resin core.

Further, since the conductor layer 412 is disposed in order to cover at least a portion of the resin core 410, the conductor layer (wiring, or the like) 140a disposed in the element forming area of the first substrate BS1 and the conductor layer 140b (wiring, or the like, connected to the outer pad) disposed out of the element forming area may be electrically connected to each other via the conductor layer. Further, for example, the conductor of the first substrate side BS1 and the conductor of the second substrate side BS2 may be connected to each other.

Figure 5:
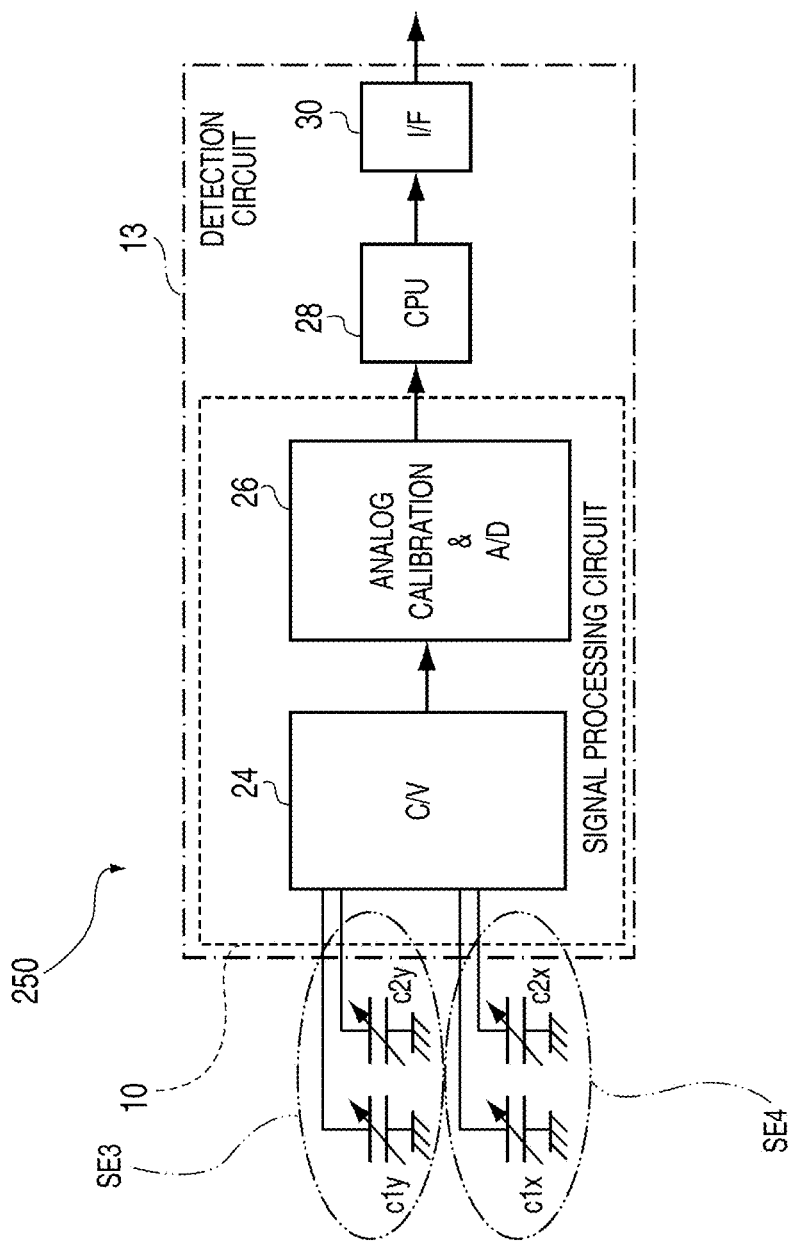
FIG. 5 is a diagram showing a circuit configuration example of an inertia sensor.

Next, one example of the circuit configuration of the inertia sensor using the element structure will be described. FIG. 5 is a diagram showing a circuit configuration example of the inertia sensor. The inertia sensor 250 (for example, a capacitive MEMS acceleration sensor) includes the Y-axial sensor element SE3 (including the first capacitor c1*y* and the second capacity c2*y*) as the first sensor element, the X-axial sensor element SE4 (including the first capacitor c1*x* and the second capacitor c2*x*) as the second sensor element, and the detection circuit 13. As shown in FIG. 3B, the detection circuit 13 may be disposed in, for example, an empty space on the first substrate BS1.

The detection circuit 13 includes a signal processing circuit 10, a CPU 28, and an interface circuit 30. The signal processing circuit 10 includes a C/V conversion circuit (a capacitance value/voltage conversion circuit) 24, and an analog calibration and A/D conversion circuit 26. However, this example is only an example and the signal processing circuit 10 may also include the CPU 28 or the interface circuit (I/F) 30.

Next, an example of the configuration and the operation of the C/V conversion circuit (C/V conversion amplifier) will be described with reference to FIGS. 6A to 6C. FIGS. 6A to 6C show diagrams for illustrating a configuration and an operation of the C/V conversion circuit.

FIG. 6A shows a basic configuration of the C/V conversion amplifier (a charge amplifier) using a switched capacitor and FIG. 6B shows voltage waveforms of each part of the C/V conversion amplifier shown in FIG. 6A.

As shown in FIG. 6A, the basic C/V conversion circuit includes a first switch SW1 and a second switch SW2 (configuring a variable capacitor c1 (or c2) and a switched capacitor of an input unit), an operational amplifier (OPA) 1, a feedback capacitor (an integral capacitor) Cc, a third switch SW3 resetting the feedback capacitor Cc, a fourth switch SW4 sampling output voltage Vc from the operational amplifier (OPA) 1, and a holding capacitor Ch.

Further, as shown in FIG. 6B, the first switch SW1 and the third switch SW3 are controlled to be turned on/off at a first clock that is in-phase and the second switch SW2 is controlled to be turned on/off at a second clock that is a reverse phase from the first clock. The fourth switch SW4 is briefly turned on at an end of a period in which the second switch SW2 is turned on. When the first switch SW1 is turned on, both ends of the variable capacitor c1 (c2) are applied with a predetermined voltage Vd, such that charges are accumulated in the variable capacitor c1 (c2). In this case, since the third switch is in a turned on state, the feedback capacitor Cc is in a reset state (state in which both ends are short). Next, when the first switch SW1 and the third switch SW3 are turned off and the second switch SW2 is turned on, both ends of the variable capacitor c1 (c2) commonly become the ground potential, such that the charges accumulated in the variable capacitor c1 (c2) move towards an operational amplifier (OPA) 1.

In this case, since the charge amount is reserved, Vd·C1 (C2)=Vc·Cc is established, such that the output voltage Vc from the operational amplifier (OPA) 1 becomes (C1/Cc)·Vd. In other words, a gain of the charge amplifier is determined by a ratio of the capacitance value (C1 or C2) of the variable capacitor c1 (or c2) to the capacitance value of the feedback capacitor Cc. Next, when the fourth switch (sampling switch) SW4 is turned on, the output voltage Vc from the operational amplifier (OPA) 1 is maintained by the holding capacitor Ch. The held voltage is Vo and Vo is the output voltage from the charge amplifier.

As described above, the C/V conversion circuit 24 substantially receives the differential signal from each of two variable capacitors (first variable capacitor c1 and second variable capacitor c2). In this case, as the C/V conversion circuit 24, for example, as shown in FIG. 6C, the charge amplifier having a differential configuration may be used. The input end of the charge amplifier shown in FIG. 6C is provided with first switched capacitor amplifiers SW1*a*, SW2*a*, OPA1*a*, Cca, and SW3*a* amplifying a signal from the first variable capacitor c1 and second switched capacitor amplifiers SW1*b*, SW2*b*, OPA1*b*, Ccb, and SW3*b* amplifying a signal from the second variable capacitor c2. Further, the output signals (differential signals) from each of the operational amplifiers (OPAs) 1*a* and 1*b* are input to a differential amplifier (OPA2 and resistors R1 to R4) disposed at the output end thereof.

As a result, the amplified output signal Vo is output from the operational amplifier (OPA) 2. The base noise (in-phase noise) may be removed by using the differential amplifier. In addition, the configuration example of the above-mentioned C/V conversion circuit 24 is only an example and there is no limitation to the configuration.

Second Embodiment

In the second embodiment, the third sensor element is further disposed on at least one of the first substrate and the second substrate. In the third sensor element, an axis in the third direction (Z-axis) intersecting with (for example, perpendicular to) a surface including the first direction (Y-axis direction) and the second direction (X-axis direction) becomes a detection axis.

Figure 7A:
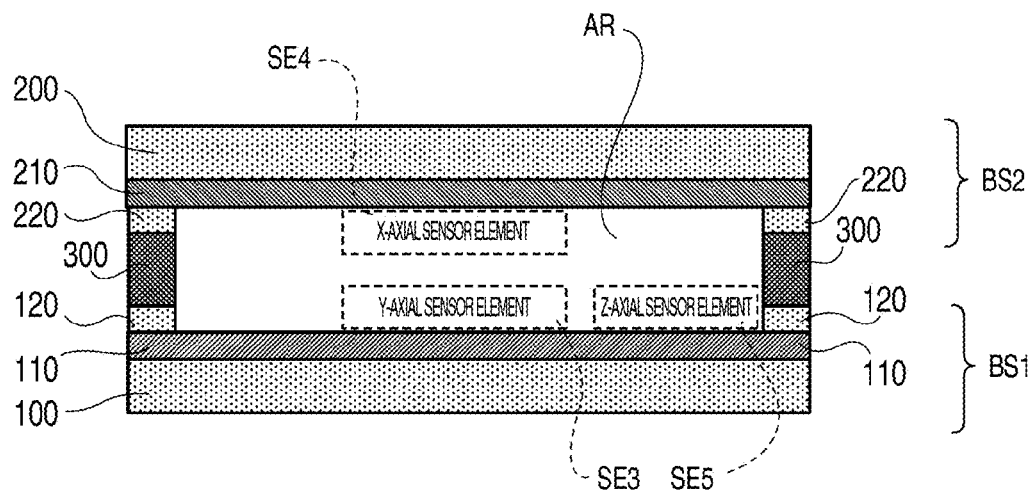
FIGS. 7A and 7B are diagrams showing an example of a configuration of the element structure further including a third sensor element.
Figure 7B:
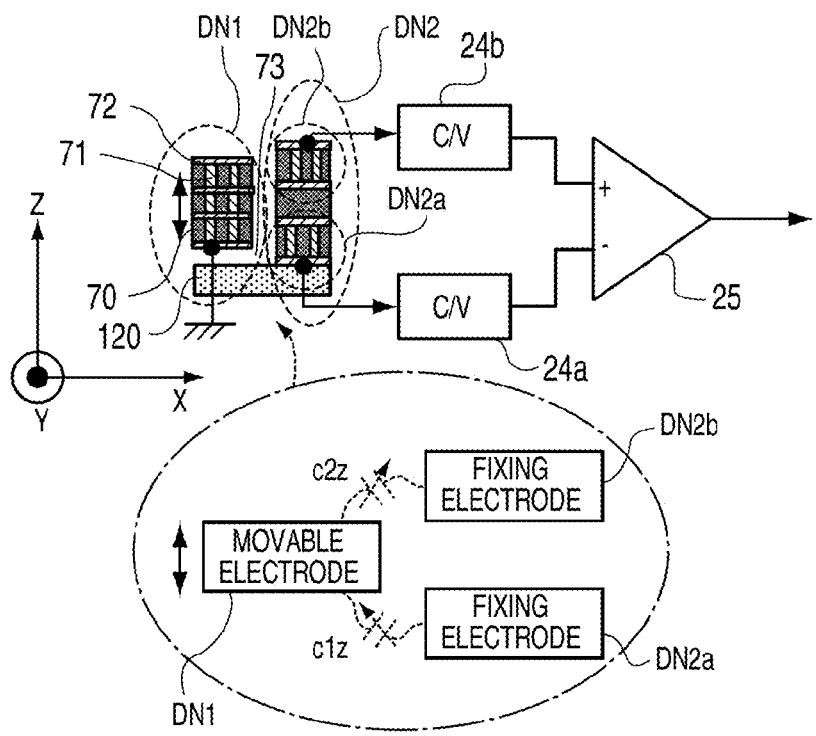

FIGS. 7A and 7B show one example of a configuration of the element structure further including the third sensor element. In the example of FIG. 7A, the Z-axial sensor element SE5 is disposed on the first substrate BS1. A Z-axial sensor element SE5 may be disposed on the second substrate BS2 and may also be disposed on both the first substrate and the second substrate. In the Z-axial sensor element SE5, the Z-axis (an axis perpendicular to a surface including the X-axis and the Y-axis) becomes the detection axis. Accordingly, in addition to the first direction and the second direction, the element structure having detection sensitivity is implemented in the third direction as well.

The third sensor element (the capacitor as the third sensor element) may be formed by disposing, for example, the conductor layers extending in the third direction to face each other, while being spaced away from each other and using a side of one conductor layer as the fixing electrode, and a side of the other conductor layer as the movable electrode.

FIG. 7B shows a configuration example of the Z-axial sensor element SE5. The Z-axial sensor element SE5 may be manufactured by, for example, forming the multilayer structure including the plurality of interlayer dielectric layers and the metal layer on the first active layer 120 and forming a movable electrode structure DN1 and a fixing electrode structure DN2 (shaking a first fixing electrode structure DN2*a* and a second fixing electrode structure DN2*b*) by patterning the multilayer structure.

A cavity part 73 is disposed around the movable electrode structure DN1 and the movable electrode structure DN1 is singled-supported or double-supported by an elastic deformation part (not shown). Further, the movable electrode structure DN1 is, for example, a multiplayer stacking structure that includes an interlayer dielectric layer 70, a metal wiring layer 71 made of aluminum or the like, a contact plug 72 made of tungsten or the like. The movable electrode structure DN1 is a structure that serves as the movable electrode part and the movable weight part and when being applied with the force in the Z-axis direction, is displaced in the direction force is applied.

Meanwhile, the fixing electrode structure DN2 is disposed in order to face the movable electrode structure DN1.

The fixing electrode structure DN2 includes a first fixing electrode structure DN2$a$ and a second fixing electrode structure DN2$b$. The fixing electrode structure DN2 is fixed to the first active layer 120. The fixing electrode structure DN2 is a multilayer stacking structure that includes the interlayer dielectric layer, the metal wiring layer, and the contact plug, similar to the moving electrode structure DN1.

As shown being surrounded by a dashed line, the bottom side of FIG. 7B is provided with a first variable capacitor (a parallel plate capacitor) $c1z$ by the movable electrode structure DN1 that serves as the movable electrode and the first fixing electrode structure DN2$a$ that serves as the fixing electrode and is also provided with a second variable capacitor (a parallel plate capacitor) $c2z$ by the movable electrode structure DN1 that serves as the movable electrode and the second fixing electrode structure DN2$b$ that serves as the fixing electrode. The first variable capacitor $c1z$ and the second variable capacitor $c2z$ are differential capacitors.

For example, when the movable electrode structure DN1 that serves as the movable electrode is displaced in a positive Z-axis direction (the upper side in the drawing), an opposing area (an opposing area of the sides) of the movable electrode structure DN1 and the first fixing electrode structure DN2$a$ is reduced. Therefore, the capacitance value of the first variable capacitance (a parallel plate capacitor) $c1z$ is reduced. Meanwhile, the opposing area (an opposing area of the sides) of the movable electrode structure DN1 and the second fixing electrode structure DN2$b$ is increased. Therefore, the capacitance value of the second variable capacitance (a parallel plate capacitor) $c2z$ is increased. The variation (that is, the magnitude of a physical quantity such as acceleration or angular velocity) of the capacitance value of the capacitor may be detected by converting the change in the capacitance values of each of the first variable capacitor $c1z$ and the second variable capacitor $c2z$ into the electrical signals in each of the C/V conversion circuits 24$a$ and 24$b$ and amplifying the differential signals obtained from the results thereof by a differential amplifier 25.

Third Embodiment

In the second embodiment, the third sensor element (the Z-axial sensor element) is formed on a single substrate, but in the third embodiment, the third sensor element is configured by combining the first substrate and the second substrate that are disposed to face each other.

Figure 8A:
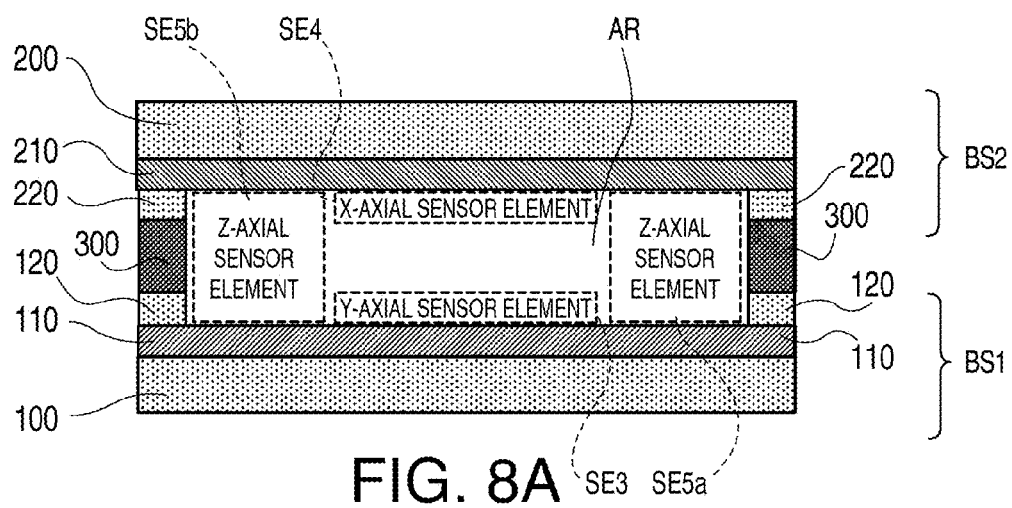
FIGS. 8A and 8B are diagrams showing another example of a configuration of an element structure further including a third sensor element.
Figure 8B:
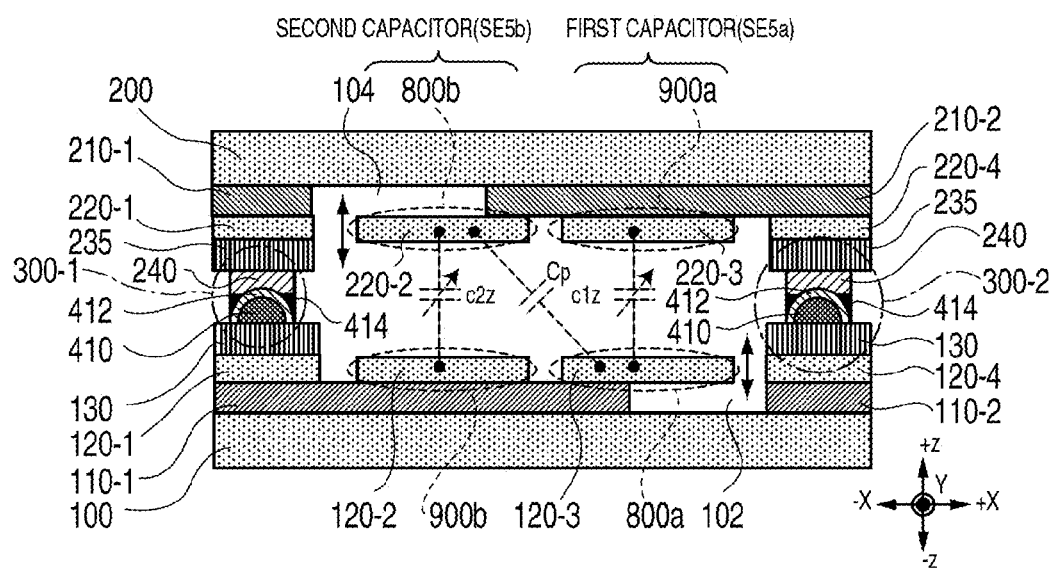

FIGS. 8A and 8B show another example of a configuration of the element structure further including the third sensor element. As shown in FIG. 8A, Z-axial sensor elements SE5$a$ and SE5$b$ (differential capacitors for detecting physical quantity in the Z-axis direction) as the third sensor element is configured by combining the first substrate and the second substrate (however, they are not limited to the differential capacitors, but there may also be a case in which only any one of the capacitors is disposed).

FIG. 8B shows one example of a sectional structure of Z-axial sensor elements SE5$a$ and SE5$b$ as the third sensor element shown in FIG. 8A. In the first substrate BS1 shown in the example of FIG. 8B, the first insulating layer 110 on the first support layer 100 is patterned, such that the patterned first insulating layers 110-1 and 110-2 remain, while a portion in which the first insulating layer 110 is removed is provided with a first cavity part 102. Further, the first active layer 120 on the first insulating layer 110 is patterned, such that the patterned first active layers 120-1, 120-2, and 120-3 remain. The patterned first active layer 120-3 becomes a first movable beam (a first movable part) 800$a$. One end of the first movable beam (the first movable part) 800$a$ is supported by the first insulating layer 110 and the surroundings of the other end of the first movable beam 800$a$ is provided with the first cavity part 102. Further, the patterned first active layer 120-2 becomes a second fixing part 900$b$. The second fixing part 900$b$ is fixed to the first insulating layer 110-1.

Further, the insulating layer 130 is disposed on the first active layer 120 (120-1 and 120-4) in the first substrate BS1. The spacer members 300-1 and 300-2 having the resin core structure described above with reference to FIG. 4 is disposed on the insulating layer 130. The spacer members 300-1 and 300-2 are provided with the patterned conductor layer (metal layer, or the like) 412 that is formed on the resin core 410 and at least a portion of the resin core 410.

Meanwhile, in the second substrate BS2 shown in FIG. 8B, the second active layer 220 is patterned, such that the patterned second active layers 220-1, 220-2, and 220-3 remain. The patterned second active layer 220-3 configures the first fixing part 900$a$. The first fixing part 900$a$ is fixed to the second insulating layer 210-2. Further, the patterned second active layer 220-2 configures a second movable beam (a second movable part) 800$b$. One end of the second movable beam (the second movable part) 800$b$ is supported by the second insulating layer 210-2 and the surroundings of the other end of the second movable beam (the second movable part) 800$b$ is provided with the second cavity part 104.

The first capacitor $c1z$ for the third sensor element is constituted by the first movable beam 800$a$ and the first fixing part 900$a$ and the second capacitor $c2z$ for the third sensor element is constituted by the second movable beam 800$b$ and the second fixing part 900$b$. Further, the insulating layer 235 is disposed on the second active layer 220 (220-1 and 220-4) in the second substrate BS2. Further, the conductor layer (the metal layer, or the like) 240 is disposed on the insulating layer 235. The conductor layer 240 is effective in the case in which there is a need to electrically connect between the conductor layer of the first substrate BS1 and the conductor layer of the second substrate BS2.

In the example of FIG. 8B, when the first substrate BS1 and the second substrate BS2 are disposed to face each other, while being spaced by, for example, a predetermined distance, the first movable beam 800$a$ and the first fixing part 900$a$ are in an opposing state (an overlapping state when seen in plan view), such that the first capacitor (the first parallel plate capacitor) $c1z$ is formed. Similarly, the second movable beam 800$b$ and the second fixing part 900$b$ are in an opposing state (an overlapping state when seen in plan view), such that the second capacitor (the second parallel plate capacitor) $c2z$ is formed.

When the force (acceleration or Coriolis force) in the Z direction (that is, the third direction) perpendicular to the main surface (a horizontal surface) of each substrate BS1 and BS2 is applied, the distance (the gap between capacitors) between the first movable electrode and the first fixing electrode and the distance between the second movable electrode and the second fixing electrode are changed by displacing the first movable beam 800$a$ and the second movable beam 800$b$ and thus, the capacitance values of the first capacitor $c1z$ and the second capacitor $c2z$ are changed. Therefore, the acceleration or Coriolis force (rotation angular velocity) in the third direction may be detected.

According to the structure, each of the first substrate BS1 and the second substrate BS2 is disposed in an opposing state to each other, while being spaced by the predetermined distance and therefore, the insulation between the first substrate and the second substrate is secured. Accordingly, it is not necessary to form a special structure for isolating between the conductor layers disposed on each substrate BS1 and BS2. That is, when the first substrate BS1 and the second substrate BS2 face each other at a predetermined distance, the isolation between the conductor layers (conductive members) is essentially realized in the direction (for example, the Z-axis direction) perpendicular to each substrate. As a result, the manufacturing process of the element structure including the capacitor is simplified.

Further, for example, when the SOI substrate having a thick active layer, or the like, is used and the movable beam 800a (or the second movable beam 800b) is configured using the thick active layer, the mass (the mass of a movable weight) necessary to detect an inertia force (substantially, a physical quantity such as acceleration or angular velocity) with high accuracy may be easily secured. Therefore, the sensor sensitivity is easily improved.

Further, the first capacitor for the third sensor and the second capacitor for the third sensor may be used as the differential capacitors.

In the example of FIG. 8B, in the first capacitor c1z and the second capacitor c2z, the positional relationship between the movable electrode and the fixing electrode are in a reverse state. Therefore, when the capacitance value of one capacitor is increased, the capacitance value of the other capacitor is reduced correspondingly, such that the first capacitor c1z and the second capacitor c2z may be used as the differential capacitors. The differential detection signal is obtained by converting the variation in the capacitance values of each of the first capacitor c1z and the second capacitor c2z into the electrical signal. The in-phase noise may be offset by differentiating the detection signal. Further, the direction of force (the direction in which force is applied) may also be detected by detecting which one of two detection signals is increased. Further, since the capacitance value of the capacitor for detecting the inertia force is substantially increased and the movement of charge is increased by disposing the plurality of capacitors (that is, the first capacitor and the second capacitor), the signal amplitude of the detection signal may be increased.

Further, when the structure of FIG. 8B is adopted, crosstalk (interaction) due to coupling between the first capacitor c1z and the second capacitor c2z may be practically reduced to a level that does not cause any problem. For example, the case in which the fixing electrode of the capacitor is used as a common potential and the detection signal is obtained from the movable electrode is considered. Generally, as the element structure is miniaturized, the distance between the first capacitor c1z and the second capacitor c2z is shortened, and coupling due to parasitic capacitance may easily occur between the movable electrodes of each capacitor.

However, according to the structure of the element structure shown in FIG. 8B, as described above, the first movable electrode (the first movable beam 800a) of the first capacitor c1z is disposed on the first substrate BS1 side and on the other hand, the second movable electrode (the second movable beam 800b) is disposed on the second substrate BS2 side. Since each substrate BS1 and BS2 is spaced by the predetermined distance in a direction perpendicular to the substrate surface (for example, the Z-axis direction), the first capacitor c1z and the second capacitor c2z are disposed to be adjacent to each other when seen in plan view, the distance between the first movable electrode (the first movable beam 800a) and the second movable electrode (the second movable beam 800b) is secured. Therefore, crosstalk (interaction) due to coupling between the first capacitor c1z and the second capacitor c2z is sufficiently reduced. Therefore, it is possible to suppress the reduction in the detection sensitivity of the third sensor element SE5 while miniaturizing the element structure, by adopting the structure shown in FIG. 8B.

Next, a layout of the triaxial sensor element (the triaxial element structure) having detection sensitivity with respect to each of the X-axis, Y-axis, and Z-axis will be described.

Figure 9B:
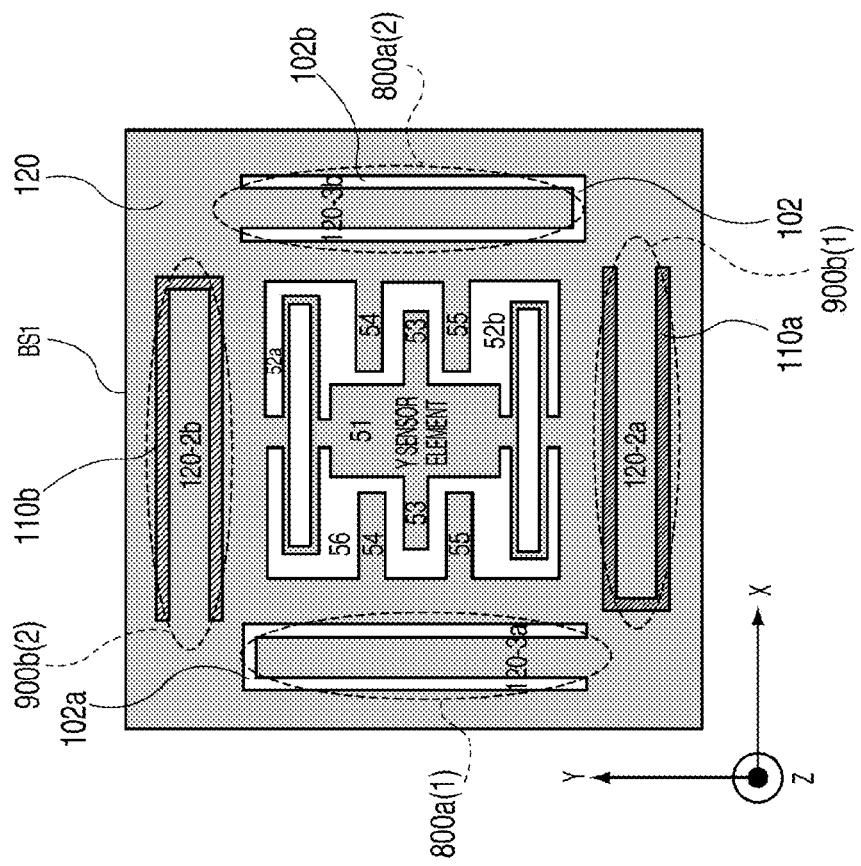
FIGS. 9A and 9B are diagrams showing layout examples in the first substrate for a triaxial sensor element structure having detection sensitivity with respect to each of the X-axis, Y-axis, and Z-axis.
Figure 9A:
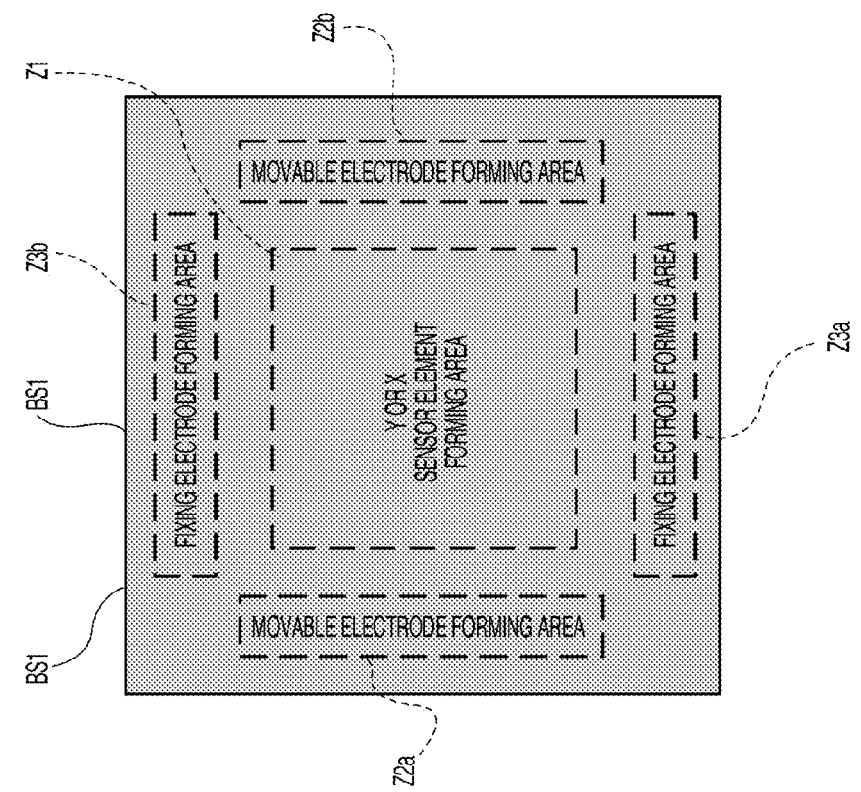

FIGS. 9A and 9B show layout examples in the first substrate for the triaxial sensor element structure having detection sensitivity with respect to each of the X-axis, Y-axis, and Z-axis. FIG. 9A shows the layout example for the forming areas of each component and FIG. 9B shows a detailed layout example of the first substrate. In addition, the layout example may also be applied to the second substrate BS2. In addition, in the detailed layout of FIG. 9B, like parts common to the above-mentioned embodiments are denoted by like reference numerals.

In the layout example of FIG. 9A, the center of the first substrate BS1 is provided with a forming area Z1 of the Y-axial sensor element SE3 or the X-axial sensor element SE4 (the Y sensor element or the X sensor element). That is, the first sensor element SE1 or the second sensor element SE2 is formed at the central portion of the first substrate BS1. Further, a forming area Z2 (Z2a and Z2b) of the movable electrode configuring the third sensor element SE5 (the Z-axial sensor element or the Z sensor element) and a forming area Z3 (Z3a and Z3b) of the fixing electrode is disposed in an empty area (an area of four corners) around the forming area z1 (a central area) of the first sensor element and the second sensor element.

In the detailed layer example shown in FIG. 9B, the Y-axial sensor element (the Y sensor element) is formed at the center of the first substrate BS1. Further, first movable beam 800a (1) and 800a (2) that serves as the movable electrode and second fixing parts 900b (1) and 900b (2) that serves as the fixing electrode are disposed around the Y-axial sensor element (the Y sensor element). The first movable beam 800a (1) is a movable beam configuring the first capacitor of the differential capacitors and the first movable beam 800a (2) is a movable beam configuring the second capacitor. Further, the first fixing part 900b (1) is a fixing part configuring the second capacitor of the differential capacitors and the first fixing part 900b (2) is a fixing part configuring the second capacitor.

Figure 10:
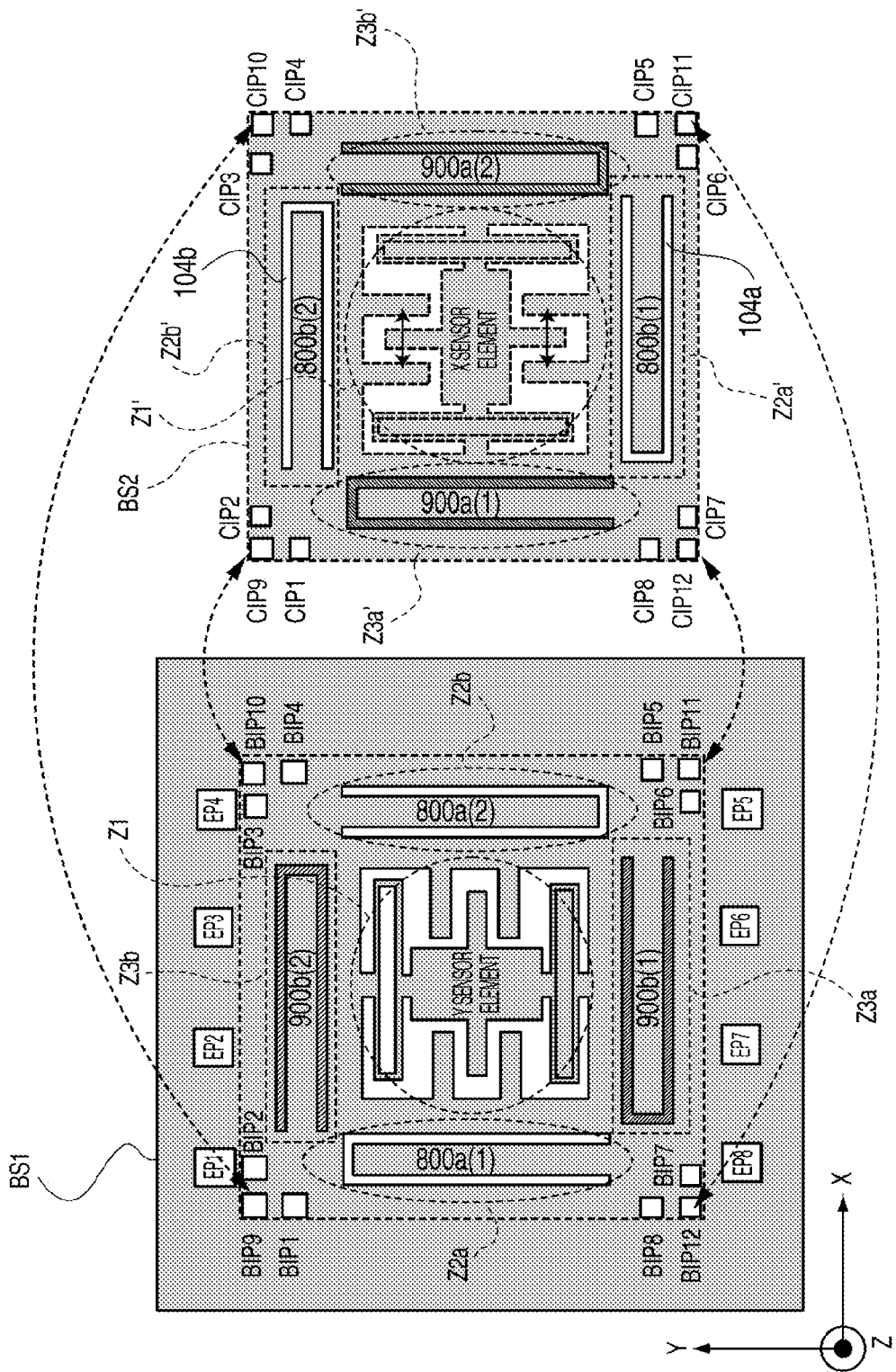
FIG. 10 is a diagram showing a detailed layout example of each of the first substrate and the second substrate.

FIG. 10 shows a detailed layout example of each of the first substrate and the second substrate. The left of FIG. 10 shows the first substrate BS1 (with the attached connection terminal) adopting the detailed layout shown in FIGS. 9A and 9B. Further, FIG. 9B shows the detailed layout example of the second substrate BS2. The layout of the element forming area of the second substrate BS2 is the same as the layout in which the layout of the element forming area of the first substrate BS1 rotates, for example, by 90° clockwise.

In the second substrate BS2, the X-axial sensor element (the X sensor element) is disposed in a central area Z1'. Further, the second movable beam 800b (1) that serves as the second movable electrode is disposed in the surrounding empty area Z2a' and the second movable beam 800b (2) that serves as the second movable electrode is disposed in the surrounding empty area Z2b'. Further, the first fixing part 900a (1) that serves as the first fixing electrode is disposed in the surrounding empty area Z3a' and the first fixing part 900a (2) that serves as the first fixing electrode is disposed in the surrounding empty area Z3b'.

The first substrate BS1 and the second substrate BS2 are disposed to face each other so that each of the inner terminals BIP1 to BIP12 of the first substrate BS1 faces each of the inner terminals CIP1 to CIP12 of the second substrate BS2 and are bonded to each other via the spacer member and the adhesive material (both are not shown).

Figure 11:
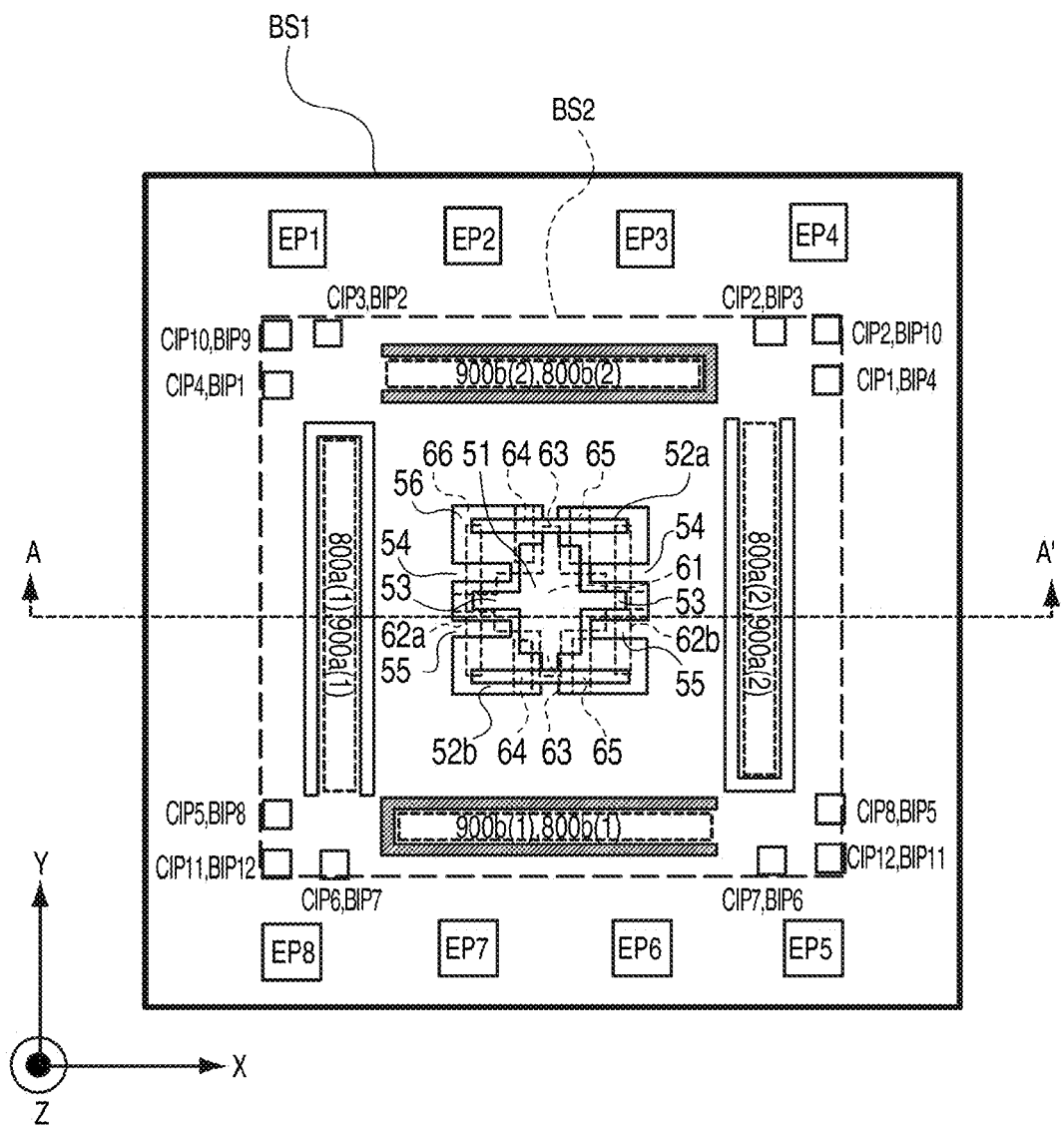
FIG. 11 is a plan view (perspective view) showing a state in which the first substrate and the second substrate adopting the detailed layout example shown in FIG. 10 are bonded to each other.

FIG. 11 is a plan view (perspective view) showing a state in which the first substrate and the second substrate adopting the detailed layout example shown in FIG. 10 are bonded to each other. As described above, the Y-axial sensor element as the first sensor element and the X-axial sensor element as the second sensor element are disposed to overlap each other at the center of the chip, when seen in plan view, such that the element structure may be miniaturized.

In the layout example of FIG. 11, the Z-axial sensor element as the third sensor element is also disposed in the empty area around the forming area (the central area) of the first sensor element and the second sensor element when seen in plan view.

That is, the first sensor element (the Y-axial sensor element) and the second sensor element (the X-axial sensor element) are disposed at the central portion of the element forming area when seen in plane view and the component (the fixing part or the movable beam) of the third sensor element (the Z-axial sensor element) may adopt the layout in order to be dispersed and disposed in the empty area around the central portion. Therefore, the layout used without wasting the element forming area is formed. Therefore, the micro element structure (the triaxial element structure) in which each of the three axes has detection sensitivity may be obtained. In addition, the overall area in which the first substrate BS1 and the second substrate BS2 overlap each other when seen in plan view may become the "element forming area".

Figure 12:
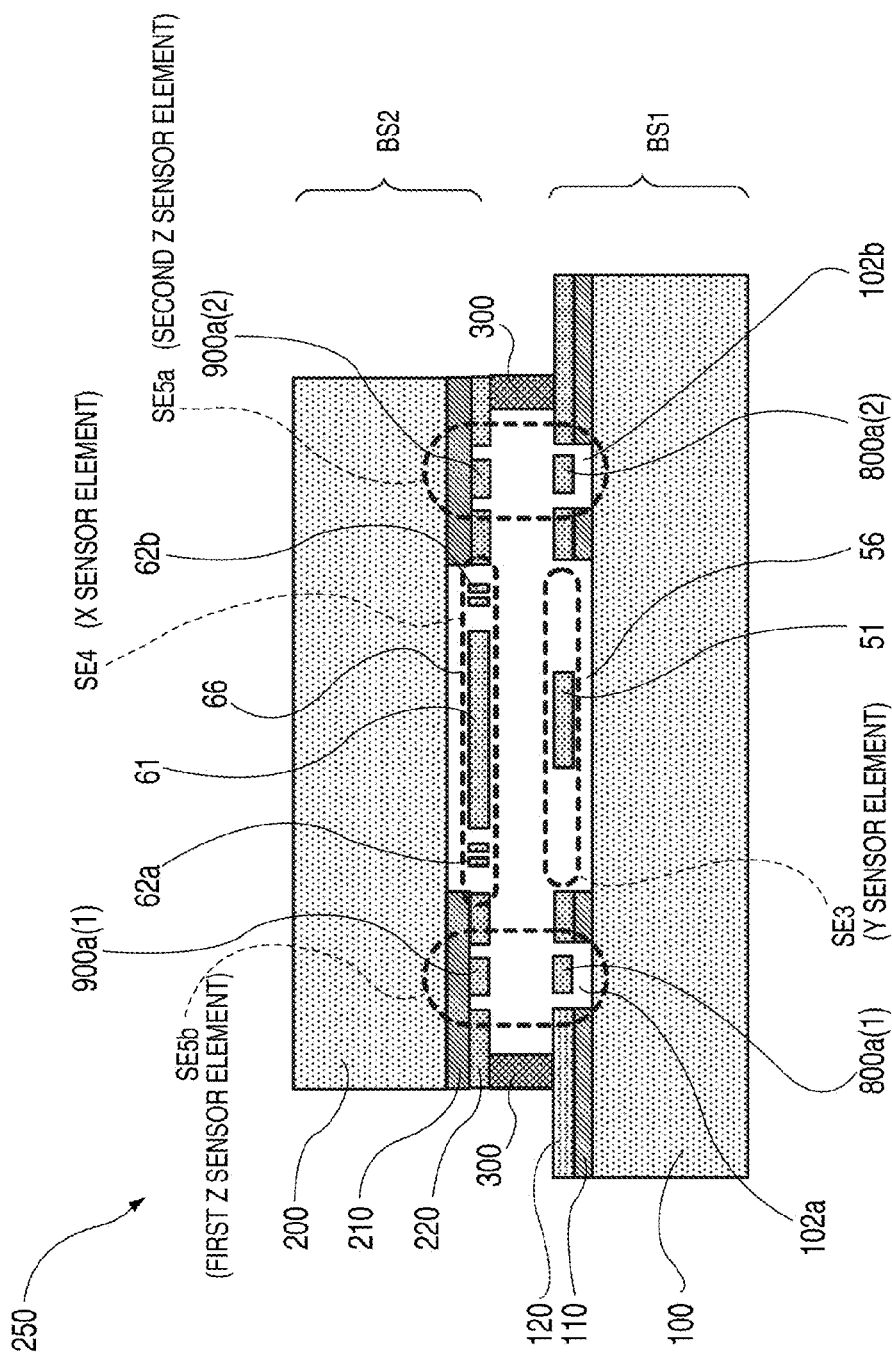
FIG. 12 is a cross-sectional view of the element structure taken along line A-A' of FIG. 11.

FIG. 12 is a cross-sectional view of the element structure taken along line A-A' of FIG. 11. The first substrate BS1 and the second substrate BS2 are bonded to each other via the spacer member 300 in the state in which they face each other, such that the triaxial element structure is configured. The center of the first substrate BS1 is provided with the Y-axial sensor element SE3 as the first sensor element, the center of the second substrate BS2 is provided with the X-axial sensor element SE4 as the second sensor element, and the Y-axial sensor element SE3 and the X-axial sensor element SE4 are in an opposing state to each other. Further, a first Z-axial sensor element SE5a (the first capacitor c1z) and a second Z-axial sensor element SE5b (the second capacitor c2z) are formed around the element structure. An ultracompact and high-performance element structure may be efficiently manufactured. The second substrate BS2 may be used as a lid substrate configuring an airtight sealing package. In this case, the element structure having high reliability to which the package is attached may be implemented without performing a special process for forming the package.

Fourth Embodiment

Figure 13:
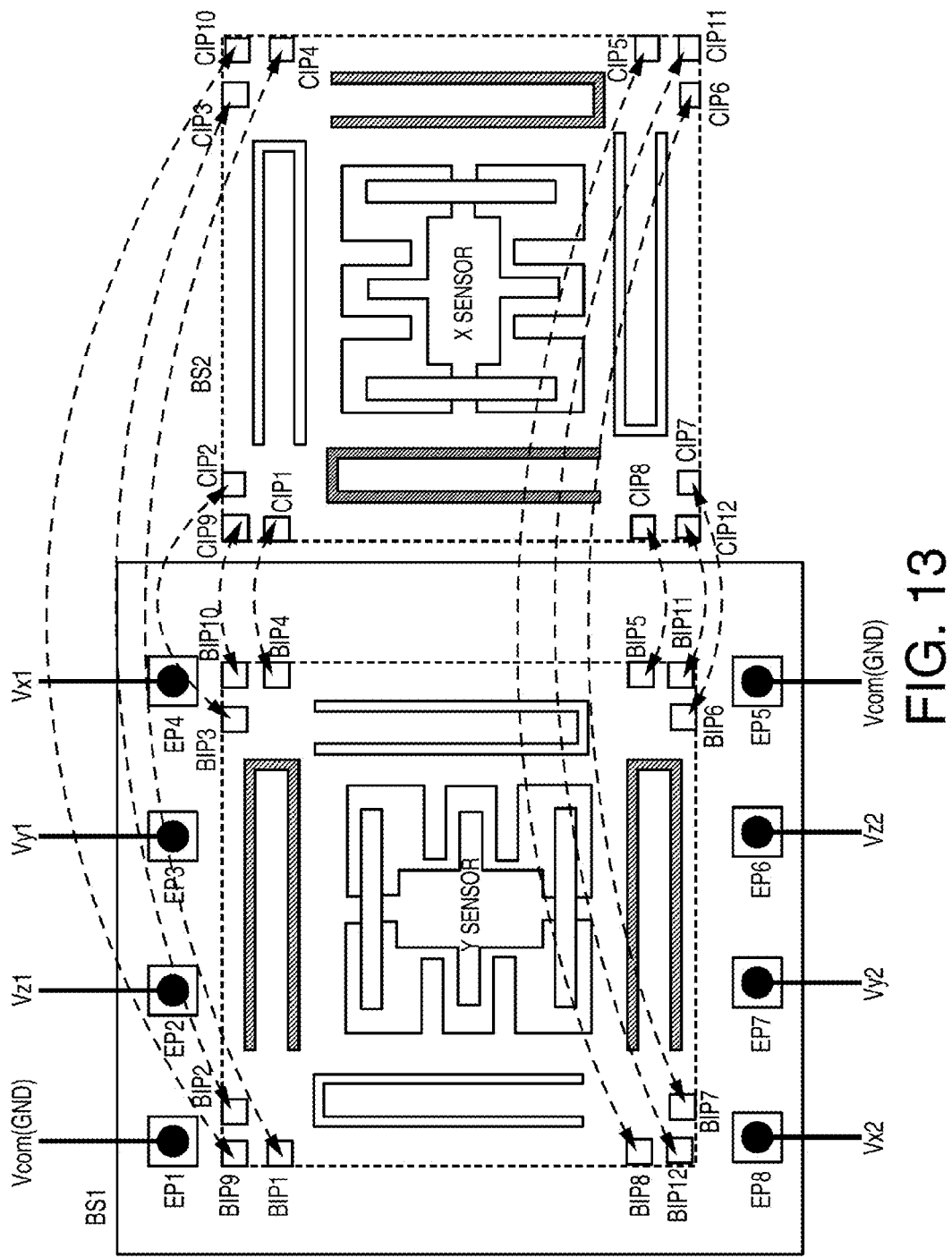
FIG. 13 is a diagram showing a function of an outer pad in the first substrate and the correspondence between an inner pad of the first substrate and an inner pad of the second substrate.

In the fourth embodiment, a pad arrangement in the element structure, a function of each pad (potential provided to each pad or signal obtained from each pad, or the like), and the example of the pattern of the wiring, or the like, will be described. FIG. 13 shows a function of an outer pad in the first substrate and the correspondence between an inner pad of the first substrate and an inner pad of the second substrate.

A common potential Vcom (for example, a ground potential GND) is applied to outer terminals EP1 and EP5 of the first substrate BS1. A first detection signal Vz1 in the Z-axis direction is output from the outer terminal EP2, a first detection signal Vy1 in the Y-axis direction is output from the outer terminal EP3, and a first detection signal Vx1 in the X-axis direction is output from the outer terminal EP4. Further, a second detection signal Vz2 in the Z-axis direction is output from an outer terminal EP6, a second detection signal Vy2 in the Y-axis direction is output from an outer terminal EP7, and a second detection signal Vx2 in the X-axis direction is output from an outer terminal EP8.

Further, each of the inner terminals BIP1 to BIP12 in the first substrate BS1 corresponds to each of the inner terminals CIP1 to CIP12 of the second substrate BS2.

Figure 14:
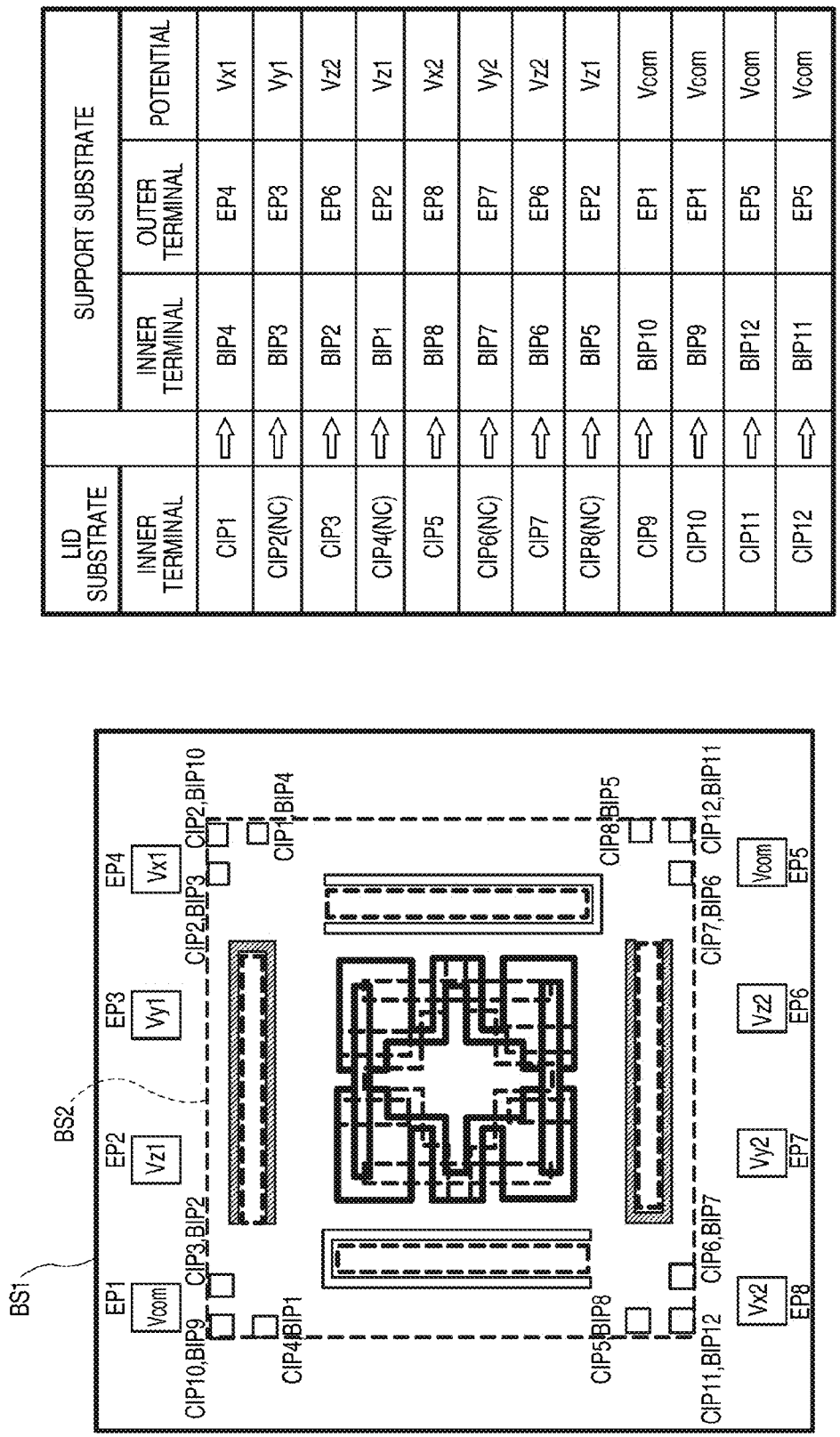
FIGS. 14A and 14B are diagrams showing a detailed structure example of the element structure.

FIGS. 14A and 14B show diagrams for illustrating the electrical connection relationship regarding each of the inner terminals of second substrate as the lid substrate. The first substrate BS1 as the support substrate and the second substrate BS2 as the lid substrate are disposed to face each other. FIG. 14A shows the potential of the outer pads EP1 to EP8 in the first substrate BS1 and the arrangement of the inner pads BIP1 to BIP12 and CIP1 to CIP12 in the first substrate BS1 and the second substrate BS2, or the like.

FIG. 14B shows the electrical connection relationship regarding each of the inner terminals CIP1 to CIP12 of the second substrate BS2 as the lid substrate in a table format. For example, the first detection signal Vx1 in the X-axis direction is output from the inner terminal CIP1 in the second substrate BS2 via the inner terminal BIP4 and the outer terminal EP4 of the first substrate BS1. The first detection signal Vy1 in the Y-axis direction is output from the inner terminal CIP2 in the second substrate BS2 via the inner terminal BIP3 and the outer terminal EP3 of the first substrate BS1. The first detection signal Vz1 in the Z-axis direction is output from the inner terminal CIP3 in the second substrate BS2 via the inner terminal BIP2 and the outer terminal EP6 of the first substrate BS1. This may also be applied to other terminals CIP4 to CIP12.

Figure 15:
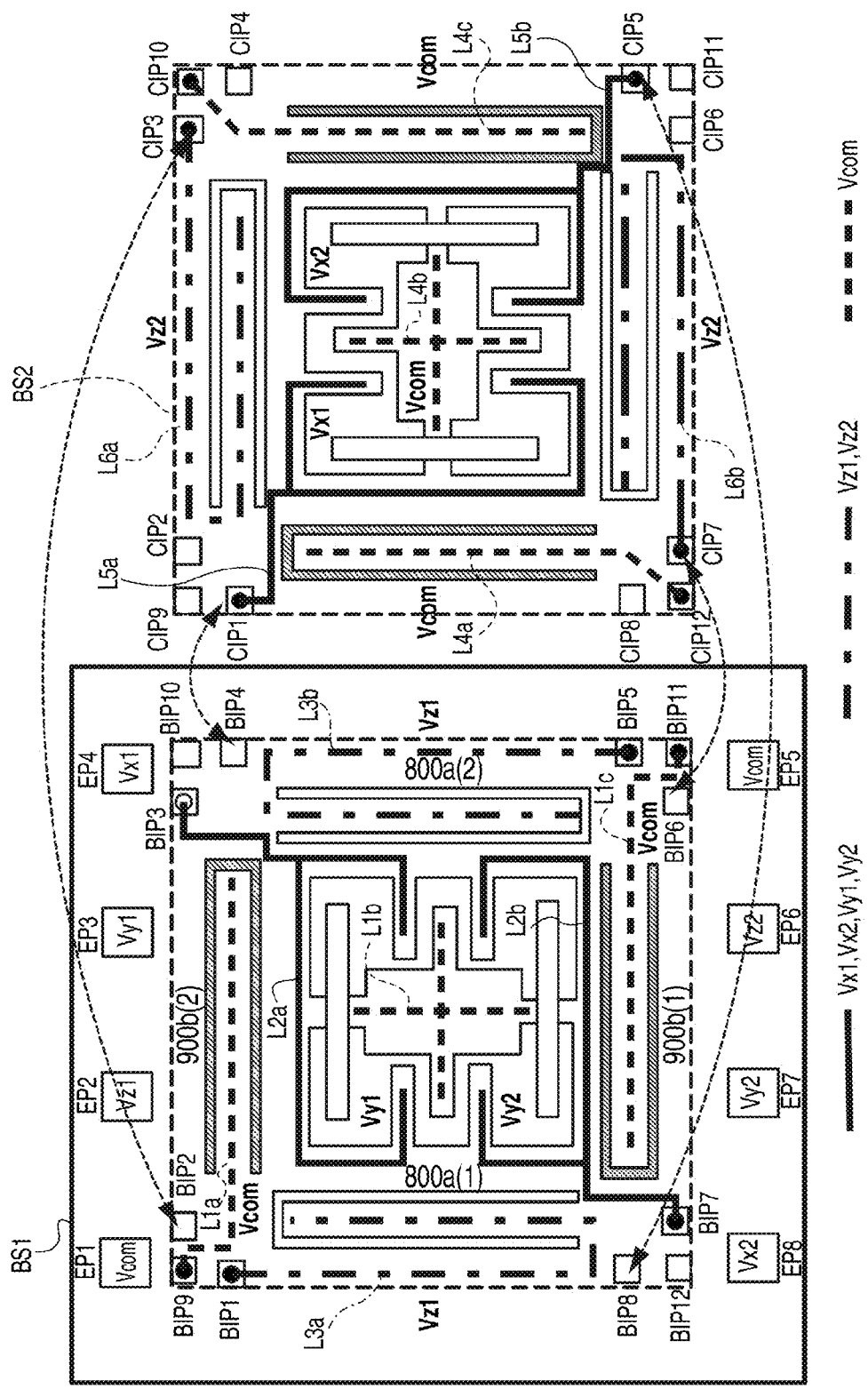
FIG. 15 is a diagram showing an example of wiring patterns in the first substrate and the second substrate.

FIG. 15 shows an example of the wiring patterns in the first substrate and the second substrate. In FIG. 15, the wiring for drawing the detections signals Vx1 and Vx2 in the X-axis direction to the outside and the wiring for drawing the detection signals Vy1 and Vy2 in the Y-axis direction to the outside are shown by a thick dashed line. Further, the wiring for drawing the detection signals Vz1 and Vz2 in the Z-axis direction to the outside is shown by a thick one-dot chain line. Further, the wiring (a GND wiring) for supplying the common potential (VCOM: GND) is shown by a thick dashed line. These wirings are the wiring (hereinafter, referred to as the active layer wiring) configured of an isolated active layer island that may be obtained by patterning the active layer on the insulating layer, the first layer wiring and the second layer wiring connected to the active layer wiring, and the contact plug, or the like.

The example of the pattern of the active layer wiring, the first layer wiring, and the second layer wiring will be described below with reference to FIGS. 16A to 18B. FIGS. 16A and 16B show the example of the patterns of the active layer wirings (the isolated active layers) in the first substrate and the second substrate. FIG. 16A shows an example of the pattern of the active layer wiring in the first substrate BS1 and FIG. 16B shows an example of the pattern of the active layer wiring in the second substrate BS2. In addition, In FIGS. 16A and 16B, parts common to the drawings in the above-mentioned embodiments are denoted by like reference numerals.

In the first substrate BS1 shown in FIG. 16A, the first active layer 120 configured of a silicon layer is formed on the first insulating layer and the isolated active layer pattern (active layer patterns 120-2a and 120-2b configuring the first movable beam, active layer patterns 120-3a and 120-3b configuring the second fixing part, and active layer patterns 51 to 55 configuring the Y-axial sensor element) are formed by patterning the first active layer. Each active layer pattern is an electrically isolated pattern. Reference numerals 110a and 110b and 110-1 to 110-8 indicate an underlying insulating layer (the first insulating layer) in the isolation area of each active layer pattern.

Further, In the second substrate BS2 shown in FIG. 16B, the second active layer 220 configured of a silicon layer is formed on the second insulating layer and the isolated active layer pattern (the active layer patterns 220-2a and 220-2b configuring the second movable beam, the active layer patterns 220-3a and 220-3b configuring the first fixing part, and the active layer patterns 61 to 65 configuring the X-axial sensor element) are formed by patterning the second active layer. Each active layer pattern is an electrically isolated pattern. Reference numerals 210a and 210b and 210-1 to 210-8 indicate an underlying insulating layer (the second insulating layer) in the isolation area of each active layer pattern.

FIGS. 17A and 17B show examples of the wiring pattern of the first layer wiring in the first substrate and the second substrate. The first layer wiring is a metal wiring formed on the insulating layer that covers, for example, the surface of the active layer.

As shown in FIG. 17A, the first substrate BS1 as the support substrate are provided with first layer wirings L1 to L11 made of metal such as aluminum. Further, in order to electrically connect between the first layer wiring and the active layer wiring (the isolated active layer pattern), the contact plugs CNP1 to CNP9 made of tungsten, or the like, are disposed. In FIG. 17A, the first layer wiring is shown by a thick solid line and the contact plug is shown by a double circle.

As shown in FIG. 17B, the second substrate BS2 as the lid substrate are provided with first layer wirings L21 to L30 made of metal such as aluminum. Further, in order to electrically connect between the first layer wiring and the active layer wiring (the isolated active layer pattern), contact plugs CNP21 to CNP30 made of tungsten, or the like, are disposed. In FIG. 17B, the first layer wiring is shown by a thick solid line and the contact plug is shown by a double circle.

Figures 18A, 18B:
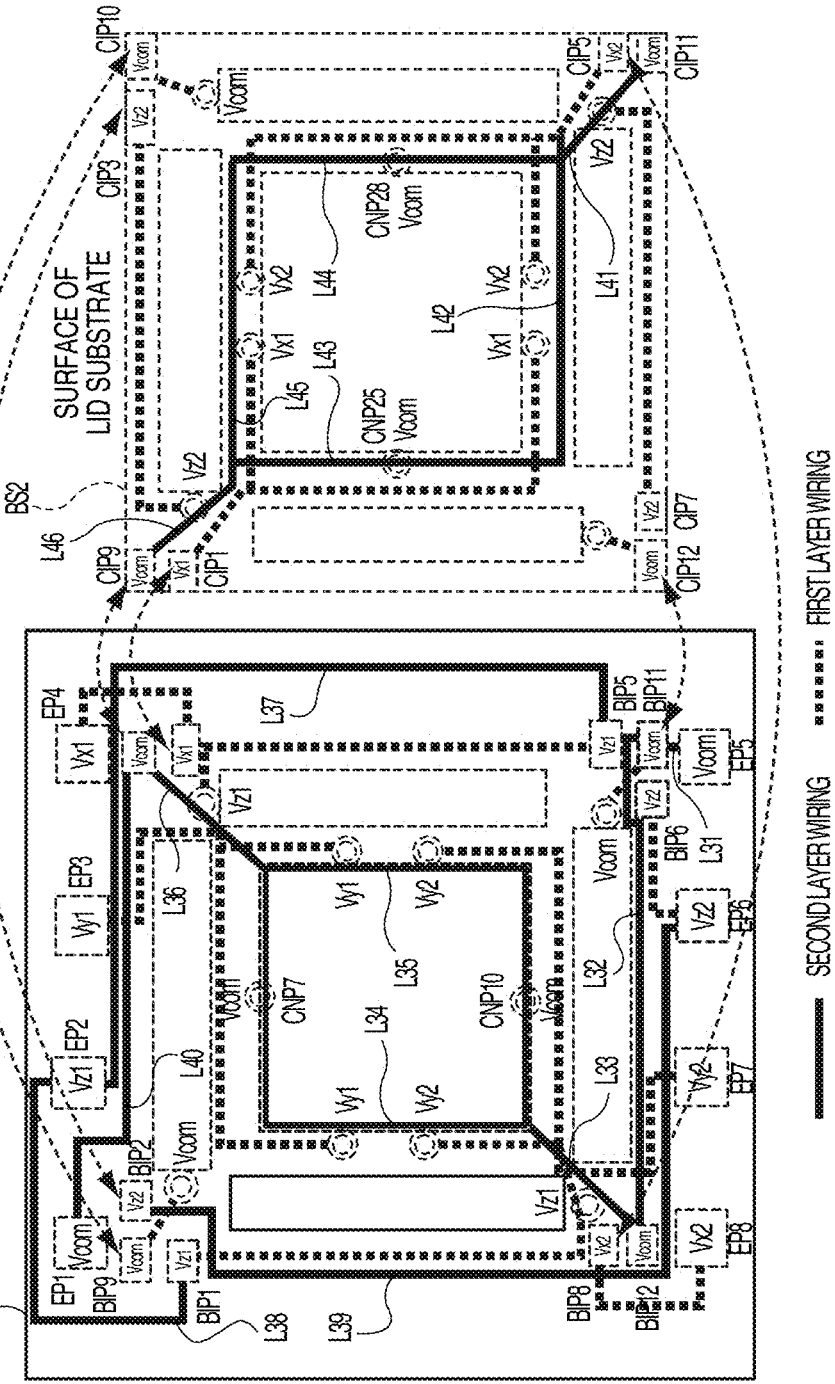
FIGS. 18A and 18B are diagrams showing an example of a wiring pattern of a second layer wiring in the first substrate and the second substrate.

FIGS. 18A and 18B show examples of the wiring pattern of the second layer wiring in the first substrate and the second substrate. The second layer wiring is a metal wiring formed on the insulating layer that covers, for example, the surface of the first layer wiring.

As shown in FIG. 18A, the first substrate BS1 as the support substrate are provided with second layer wirings L31 to L40 made of metal such as aluminum. In FIG. 18A, the second layer wiring is shown by a thick solid line. In addition, in order to elucidate the relationship between the first layer wiring and the second layer wiring, the first layer wiring is also shown together. In addition, the first layer wiring is shown by a thick dashed line in FIG. 18A.

Further, as shown in FIG. 18B, the second substrate BS2 as the lid substrate are provided with second layer wirings L41 to L46 made of metal such as aluminum.

Figures 19A, 19B:
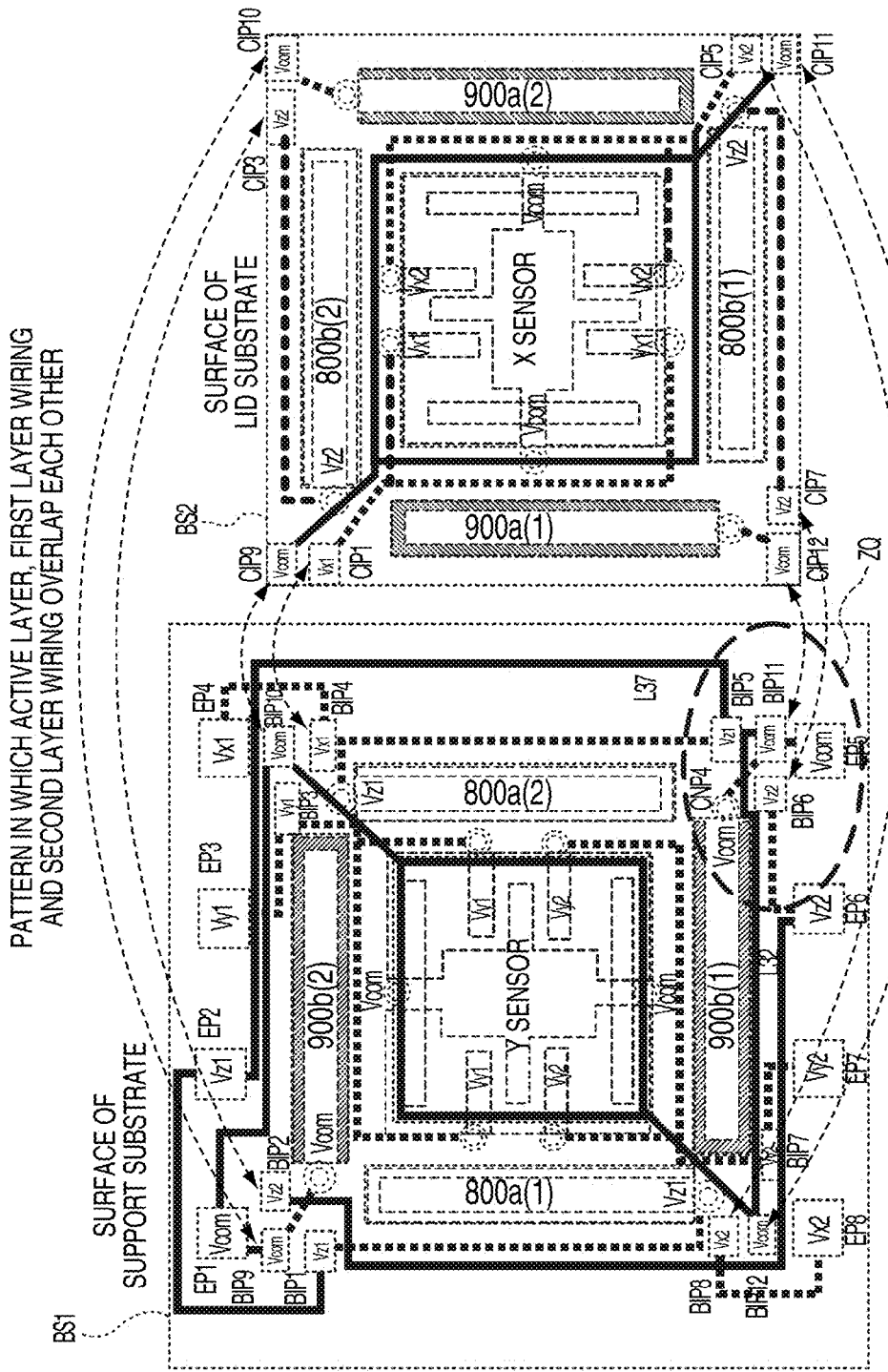
FIGS. 19A and 19B are diagrams showing an example of an active layer pattern and a pattern in which the first layer wiring and the second layer wiring overlap each other, in the first substrate and the second substrate.

FIGS. 19A and 19B show an example of the active layer pattern and the pattern in which the first layer wiring and the second layer wiring overlap each other, in the first substrate and the second substrate. As shown beforehand in FIG. 14B, the electrical connection relationship is implemented by the example of the pattern.

Figure 20A:
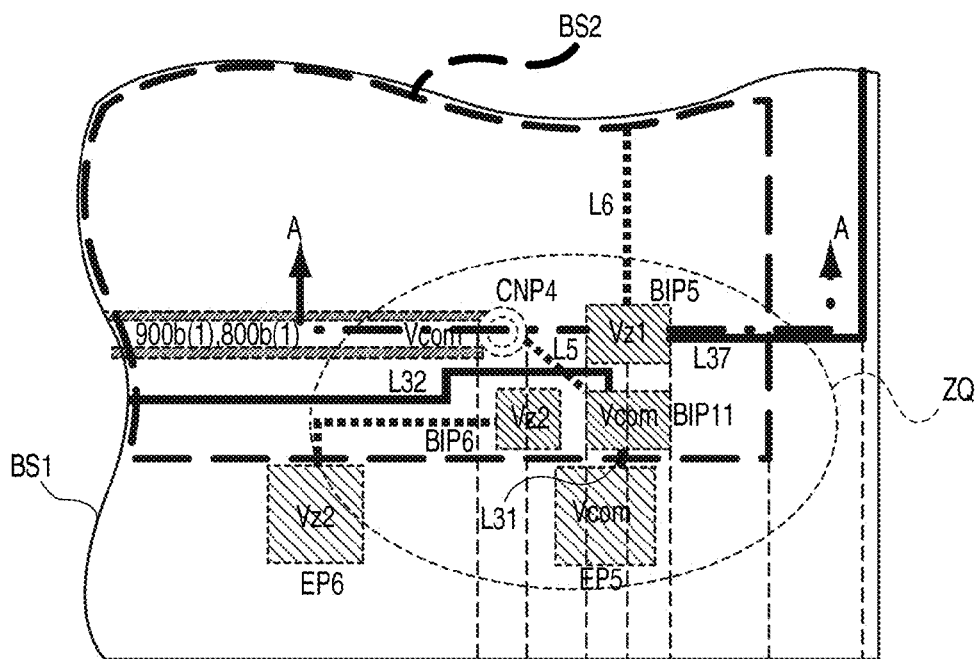
FIGS. 20A and 20B are an enlarged plan view of an area ZQ shown being surrounded by a thick dotted line and a cross-sectional view of a device taken along line A-A in FIG. 19A.
Figure 20B:
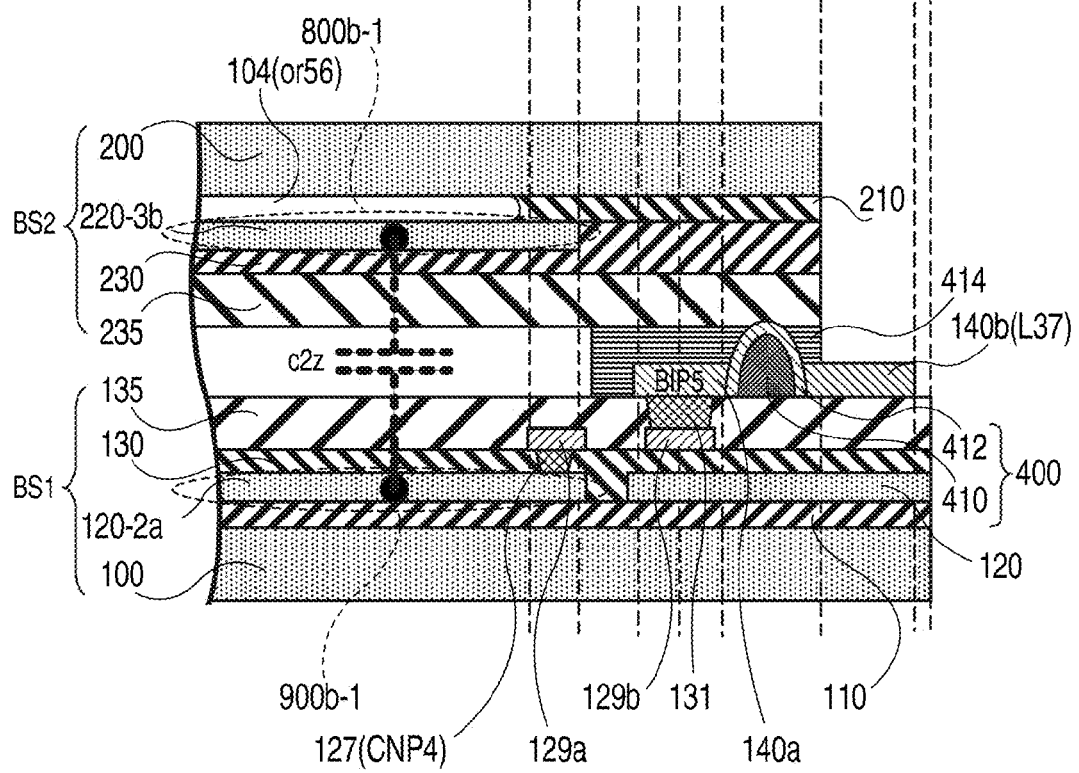

FIGS. 20A and 20B show an enlarged plan view of an area ZQ shown being surrounded by a thick dotted line and a cross-sectional view of a device taken along line A-A, in FIG. 19A. As shown in FIG. 20B, the first substrate BS1 and the second substrate BS2 are bonded to each other by the adhesive film (herein, a non-conductive film NCF) 414.

The first substrate BS1 includes the first support layer 100, the first insulating layer 110, the first active layer 120 (including the active layer 120-2a isolated by the patterning), the insulating layer 130 disposed on the first active layer 120, the interlayer dielectric layer 135, the contact plug 127 made of tungsten, or the like, (corresponding to reference numeral CNP4 of FIG. 20A), the first conductor layers 129A and 129b, the contact plug 131, the second conductor layer 140a configuring the inner pad BIP5, the second conductor layer 140b configuring the wiring L37, and the conductive spacer member having the resin core structure (including the resin core 410 and the patterned conductor layer 412). In addition, the isolated active layer 120-2a that is formed by patterning the first active layer 120 configures the second fixing part 900b (1).

Meanwhile, the second substrate BS2 includes the second support layer 200, the second insulating layer 210, the isolated active layer 220-3b formed by patterning the second active layer 220, the insulating layer 230 disposed on the second active layer, and the interlayer dielectric layer 235 disposed on the insulating layer 230. Further, the second insulating layer 210 is optionally removed, such that the cavity part 104 (or 66) is disposed. In addition, the isolated active layer 220-3b that is formed by patterning the second active layer 220 configures the second movable beam 800 (b)-1.

The second capacitor c2z in the Z-axis direction is configured by the second fixing part 900b (1) and the second movable beam 220-3b.

In the element structure shown in FIG. 20B, as described above, the conductive spacer member (a spacer which includes the conductive material as a component) having the resin core structure including the resin core part (resin core) 410 as the spacer member and the conductor layer 414 formed to cover at least a portion of a surface of the resin core part (resin core), is used. Therefore, the inner terminal BIP5 of the first substrate BS1 and the conductor layer 140b as the wiring L37 may be electrically connected to each other via the conductor layer 414.

As the material of the resin core 410, for example, a thermosetting resin such as resin may be used. The resin is hardened and has rigidity, which serves to stably support (support at the predetermined distance) the second substrate BS2 on the first substrate BS1. Further, the conductor layer 412 is formed to cover at least a portion of the surface of the resin core 410 (to contact at least the resin core 410). As described above, the conductor layer 412 may be used in order to electrically connect the inner pads BIP1 to BIP12 to the outer pads EP1 to EP8 and may also be used in order to connect each of the inner pads BIP1 to BIP12 of the first substrate BS1 to each of the inner pads CIP1 to CIP12 of the second substrate BS2.

The thickness of the conductor layer 412 is thin (further, when the first substrate BS1 is bonded to the second substrate BS2, there may be a case in which the apex portion of the resin core 410 is almost exposed). Accordingly, the distance between the first substrate BS1 and the second substrate BS2 may be accurately determined as the height of the resin core 410. Therefore, the gap between the capacitors may be accurately determined. In addition, the insulating layers 230 and 235 are formed on the second movable beam 800b (1) and these insulating layers 230 and 235 serve as a protective layer and a dielectric layer. Therefore, the capacitance value of the capacitor (c2z or the like) may be effectively increased.

Fifth Embodiment

In the fifth embodiment, an example of a method of manufacturing the above-mentioned element structure will be described.

First Process

In order to manufacture the element structure, for example, two sheets of SOI substrate (a first SOI substrate and a second SOI substrate) are prepared. The first SOI substrate corresponds to the first substrate BS1 as the support substrate and the second SOI substrate corresponds to the second substrate BS2 as the lid substrate.

Second Process

Each SOI substrate is processed by photolithography to form the Y-axial sensor element, the X-axial sensor element, and the Z-axis sensor element, respectively (for example, see FIG. 10). In addition, in each substrate, a necessary wiring layer, or the like, is formed (for example, see FIGS. 15 to 19).

Third Process

The resin layer is formed on the first SOI substrate and the above-mentioned resin core part (resin core) 410 is formed by patterning the resin layer. Further, after the conductive layer 412 is formed on the entire surface, the conductive layer is patterned. As a result, the patterned conductor layer 412 covering at least a portion of the resin core part 410 is formed (for example, see FIG. 20B).

Fourth Process

The adhesive film (for example, the non-conductive film NCF) is formed on at least one of the first SOI substrate and the second SOI substrate and the adhesive film NCF is patterned.

Fifth Process

The first SOI substrate (the first substrate BS1) and the second SOI substrate (the second substrate BS2) are bonded to each other, while facing each other (for example, see FIGS. 12, 19A, 19B, 20A, and 20B, or the like). Thereafter, as necessary, the outer peripheral portion may be cut and removed by dicing the second substrate BS2 to adjust the size of the lid substrate.

As described above, since the element structure includes the sealing structure (the package structure), the reliability is high. Further, for forming the sealing structure, the manufacturing process may be simplified without requiring the additional manufacturing process. In addition, the layout of the two sheets of substrates that are bonded to each other may be common (including the same layout or a similar layout) (that is, one substrate may be disposed to face the other substrate by rotating one substrate so that the detection axis of one substrate intersects with the detection axis of the other substrate, for example, one substrate may be disposed to face the other substrate in the state in which the one substrate rotates, for example, 90° and therefore, there is no need to adopt differing layouts per substrate). Even in this case, the manufacturing process is simplified.

Sixth Embodiment

Figure 21:
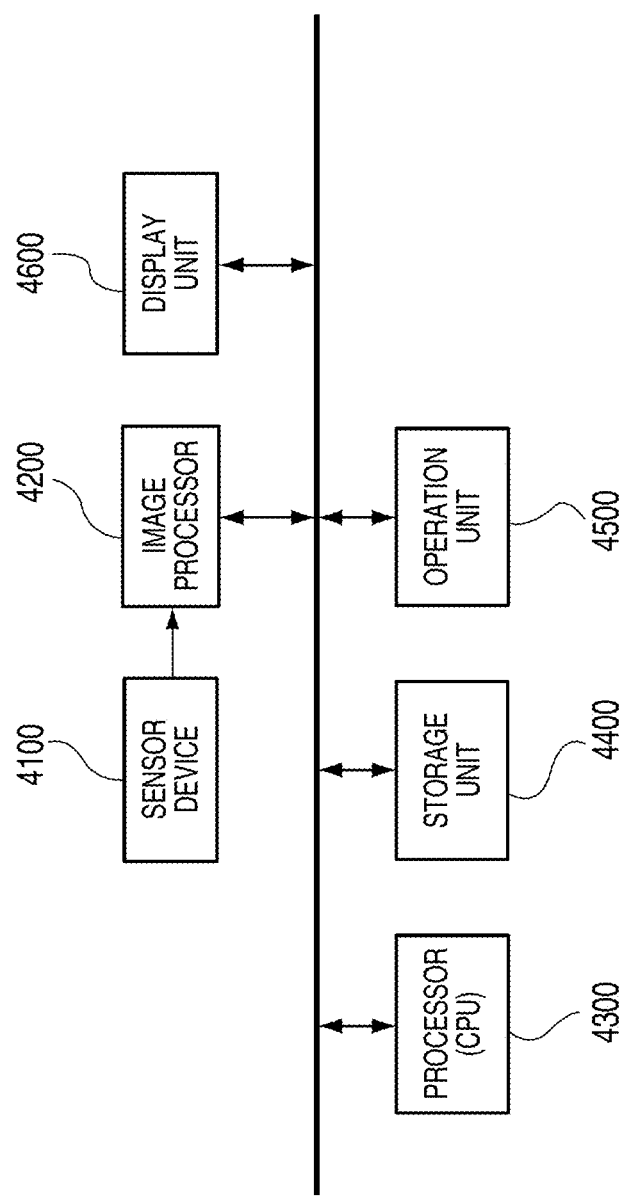
FIG. 21 is a diagram showing an example of a configuration of an electronic device.

FIG. 21 shows an example of a configuration of an electronic device. The electronic device of FIG. 21 includes the inertia sensor (capacitive MEMS acceleration sensor, or the like) according to any one of the above embodiments.

The electronic device is, for example, a game controller or a motion sensor, or the like.

As shown in FIG. 21, the electronic device includes a sensor device (capacitive MEMS acceleration sensor, or the like) 4100, an image processor 4200, a processor 4300, a storage unit 4400, an operation unit 4500, and a display unit 4600. Further, the configuration of the electronic device is not limited to the configuration of FIG. 21 and various modification embodiments in which a portion (for example, an operation unit, display unit, or the like) of the component is omitted and other components are added, or the like, may be put into practice.

Figure 22:
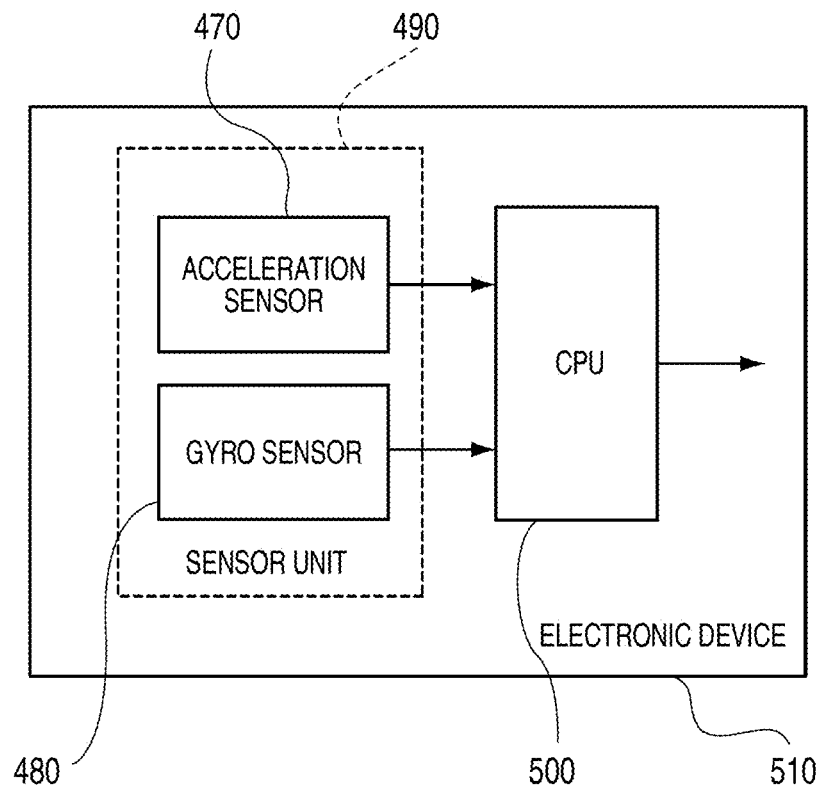
FIG. 22 is a diagram showing another example of a configuration of an electronic device.

FIG. 22 shows another example of the configuration of the electronic device. An electronic device 510 shown in FIG. 22 includes a sensor unit 490 that includes an inertia sensor 470 (herein, a capacitive MEMS acceleration sensor) according to any one of the above-mentioned embodiments of the invention and a detection element 480 (herein, a capacitive MEMS gyro sensor detecting angular velocity) detecting the physical quantity different from the acceleration and a CPU 500 that performs predetermined signal processing based on the detection signal output from the sensor unit 490. In addition, the CPU 500 may also function as the detection circuit. The sensor unit 490 itself may be considered as one electronic device.

That is, the small-sized and high-performance electronic device may be implemented by using both of the small-sized and high-performance capacitive MEMS acceleration sensor 470 having excellent assembling performance and another sensor 480 (for example, a gyro sensor using the MEMS structure) detecting different kinds of physical quantities. That is, the sensor unit 470 as the electronic device, including a plurality of sensors or an upper electronic device 510 (for example, an FA device, or the like) mounted with the sensor unit 470 may be implemented.

As described above, the small-sized and high-performance (high reliability) electronic device (for example, a game controller or a portable terminal, or the like) is implemented by using the element structure according to the embodiment of the invention. Further, a small-sized and high-performance (high reliability) sensor module (for example, a motion sensor detecting a change in a person's posture, or the like: one kind of electronic device) may also be implemented.

As described above, according to at least one of the embodiments of the invention, for example, the manufacturing of the element structure including the capacitor may be facilitated. Further, the small-sized and high-performance electronic device may be implemented.

As described above, although some embodiments have been described, the face that many modifications are possibly done may be easily understood by a person skilled in the art to which the invention pertains without substantially departing from the new matters and effects of the invention.

Therefore, all the above-mentioned modifications are included in the scope of the invention.

For example, in the specification or the drawings, terms described together with different terms having a broader meaning or the same meaning may be substituted for other terms at least once in any place of the specification or the drawings. The invention may be applied to the inertia sensor. For example, the inertia sensor may be used as a capacitive acceleration sensor and a capacitive gyro sensor.

The entire disclosure of Japanese Patent Application No. 2010-120725, filed May 26, 2010 is expressly incorporated by reference herein.

What is claimed is:

1. A movement sensor, comprising:
a first substrate that has a first support layer on which a first sensor element is mounted; and
a second substrate that has a second support layer on which a second sensor element is mounted,
wherein a surface on which the first sensor element of the first support layer is mounted and a surface on which the second sensor element of the second support layer is mounted face each other;
the first sensor element includes a first movable part including a first movable electrode that moves relative to a first fixed electrode formed on a first fixed part of the first sensor element, the first fixed electrode facing the first movable electrode; and the second sensor element includes a second movable part including a second movable electrode that moves relative to a second fixed electrode formed on a second fixed part of the second sensor element, the second fixed electrode facing the second movable electrode.

2. The movement sensor according to claim 1, wherein the first sensor element detects a force in a first direction when seen in a plan view, and the second sensor element detects a force in a second direction intersecting with the first direction when seen in the plan view.

3. The movement sensor according to claim 2, wherein the first movable part of the first sensor element includes a first movable weight part supported by the first support layer side of the second support layer, the first movable electrode being formed on the first movable weight part, wherein, when the first movable weight part is applied with the force in the first direction when seen in the plan view, the first movable electrode is displaced in the first direction, and the second movable part of the second sensor element includes a second movable weight part supported by the second support layer side of the first support layer, the second movable electrode being formed on the second movable weight part, wherein, when the second movable weight part is applied with the force in the second direction when seen in the plan view, the second movable electrode is displaced in the second direction.

4. The movement sensor according to claim 3, wherein the first sensor element includes a first capacitor of which a respective capacitance value is reduced and a second capacitor of which a respective capacitance value is increased, when the force in the first direction is applied to the first movable weight part, and the second sensor element includes a first capacitor of which a respective capacitance value is reduced and a second capacitor of which a respective capacitance value is increased, when the force in the second direction is applied to the second movable weight part.

5. The movement sensor according to claim 2, wherein at least one of the first substrate and the second substrate is provided with a third sensor element, and the third sensor element includes a capacitor of which a respective capacitance value is changed, when a force in a third direction intersecting with a surface including the first direction and the second direction is generated.

6. The movement sensor according to claim 5, wherein the third sensor element includes a first movable beam as a third movable electrode and a first fixing part, the first movable beam including one end that is supported by a first support layer side of the second support layer and another end extending into a first cavity, and the first fixing part acts as a first fixing electrode that is fixed to a second support layer side of the first support layer, wherein the first fixing part part faces the first movable beam, with a gap therebetween.

7. The movement sensor according to claim 6, wherein the third sensor element includes a second movable beam as a fourth movable electrode and a second fixing part, the second movable beam including one end that is supported by the second support layer side of the first support layer and another end extending into a second cavity, and the second fixing part acts as a second fixing electrode that is fixed to the first support layer side of the second support layer, wherein the second fixing part faces the second movable beam, with a gap therebetween.

8. The movement sensor according to claim 5, wherein the third sensor element is disposed around at least one of the first sensor element and the second sensor element when seen in the plan view.

9. The movement sensor according to claim 1, wherein at least one of the first support layer and the second support layer includes an insulating layer and at least one of the first sensor element and the second sensor element is supported via the insulating layer.

10. The movement sensor according to claim 1, wherein a spacer member is disposed between the first substrate and the second substrate.

11. The movement sensor according to claim 10, wherein a sealing body having a space formed therein is formed by the first substrate, the second substrate, and the space member.

12. The movement sensor according to claim 10, wherein the spacer member includes:

a resin core part formed using a resin; and a conductor layer formed to cover at least a portion of a surface of the resin core part.

13. An inertia sensor, comprising:

the movement sensor according to claim 1; and a signal processing circuit that processes electrical signals output from the movement sensor.

14. An electronic device having the movement sensor according to claim 1.

* * * * *